US010289700B2

(12) United States Patent
Kong et al.

(10) Patent No.: US 10,289,700 B2
(45) Date of Patent: May 14, 2019

(54) METHOD FOR DYNAMICALLY MATCHING IMAGES WITH CONTENT ITEMS BASED ON KEYWORDS IN RESPONSE TO SEARCH QUERIES

(71) Applicant: Baidu USA LLC, Sunnyvale, CA (US)

(72) Inventors: Qi Kong, Sunnyvale, CA (US); Fan Zhu, Sunnyvale, CA (US); Dong Li, Sunnyvale, CA (US); Yifei Jiang, Sunnyvale, CA (US); Shuang Wu, Sunnyvale, CA (US); Youling Zou, Sunnyvale, CA (US); Guang Yang, Sunnyvale, CA (US); Jingao Wang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 262 days.

(21) Appl. No.: 15/057,992

(22) Filed: Mar. 1, 2016

(65) Prior Publication Data
US 2017/0255652 A1    Sep. 7, 2017

(51) Int. Cl.
*G06F 17/30* (2006.01)

(52) U.S. Cl.
CPC .............................. *G06F 17/30268* (2013.01)

(58) Field of Classification Search
CPC ......... G06F 17/30259; G06F 17/30265; G06F 17/30277; G06F 17/3028; G06F 17/30684; G06F 17/30696; G06F 17/30867; G06F 17/30268
See application file for complete search history.

(56) References Cited

U.S. PATENT DOCUMENTS

| | | |
|---|---|---|
| 7,127,452 B1 | 10/2006 | Yashiro |
| 2005/0147442 A1 | 7/2005 | Walker et al. |
| 2008/0162469 A1 | 7/2008 | Terayoko et al. |
| 2010/0057846 A1 | 3/2010 | Zhang |
| 2011/0252062 A1 | 10/2011 | Hanatani et al. |
| 2012/0158686 A1 | 6/2012 | Hua et al. |
| 2012/0323930 A1 | 12/2012 | Kennberg et al. |
| 2013/0117285 A1* | 5/2013 | Ishii ................ G06F 17/30867 707/751 |
| 2013/0275418 A1 | 10/2013 | Kumar et al. |

(Continued)

FOREIGN PATENT DOCUMENTS

| | | |
|---|---|---|
| JP | 2013222412 A | 10/2013 |
| JP | 2015153094 A | 8/2015 |

*Primary Examiner* — Jay A Morrison
(74) *Attorney, Agent, or Firm* — Womble Bond Dickinson (US) LLP

(57) ABSTRACT

According to one embodiment, in response to a search query received from a client device for searching content, one or more first keywords are determined from the search query. A lookup operation is performed in an image-to-keyword (image/keyword) mapping table based on the first keywords. The image/keyword mapping table includes a plurality of entries, each entry mapping an image identifier (ID) identifying an image to one or more second keywords. For each of images identified in the image/keyword mapping table, a matching degree is determined between the first keywords and the second keywords. A ranking process is performed based on matching degrees on a plurality of images identified in the image/keyword mapping table whose second keywords match at least a portion of the first keywords.

24 Claims, 18 Drawing Sheets

(56) References Cited

U.S. PATENT DOCUMENTS

| | | | |
|---|---|---|---|
| 2013/0282753 A1 | 10/2013 | Sugimoto | |
| 2014/0032520 A1* | 1/2014 | Zhuang | G06F 17/30268 707/706 |
| 2014/0188844 A1* | 7/2014 | Kogan | G06F 17/30274 707/722 |
| 2014/0304661 A1* | 10/2014 | Topakas | G06F 3/04815 715/848 |
| 2016/0132931 A1* | 5/2016 | Levinson | G06Q 30/0263 705/14.45 |
| 2017/0147610 A1 | 5/2017 | Barre | |
| 2017/0185670 A1* | 6/2017 | Dua | G06F 17/241 |

\* cited by examiner

| Keyword(s) | Image Identifier(s) |
|---|---|
| Flower | Image 1, Image 2, Image 3, Image 4, Image 5 |
| Beijing Flower | Image 1 |
| Shanghai Flower | Image 2 |
| Flower Delivery | Image 1, Image 2, Image 4 |
| ... | ... |

| Image ID | Keyword(s) |
|---|---|
| Image 1 | Flower, Beijing, Haidian District |
| Image 2 | Flower, Shanghai, Delivery |
| Image 3 | Flower, Delivery |
| ... 351 | ... 352 |

| Keyword(s) 751 | Image Identifier(s) 752 |
|---|---|
| Flower 721 | Image 1, Image 2, Image 3, Image 4, Image 5 |
| Beijing Flower 722 | Image 1, Image 2, Image 3, Image 4, Image 5 |
| Shanghai Flower 723 | Image 1, Image 2, Image 3, Image 4, Image 5 |
| Flower Delivery 724 | Image 1, Image 2, Image 3, Image 4, Image 5 |
| ... | ... |

| Keyword(s) 701 | Image Identifier(s) 702 |
|---|---|
| Flower 721 | Image 1, Image 2, Image 3, Image 4, Image 5 |
| ... | ... |

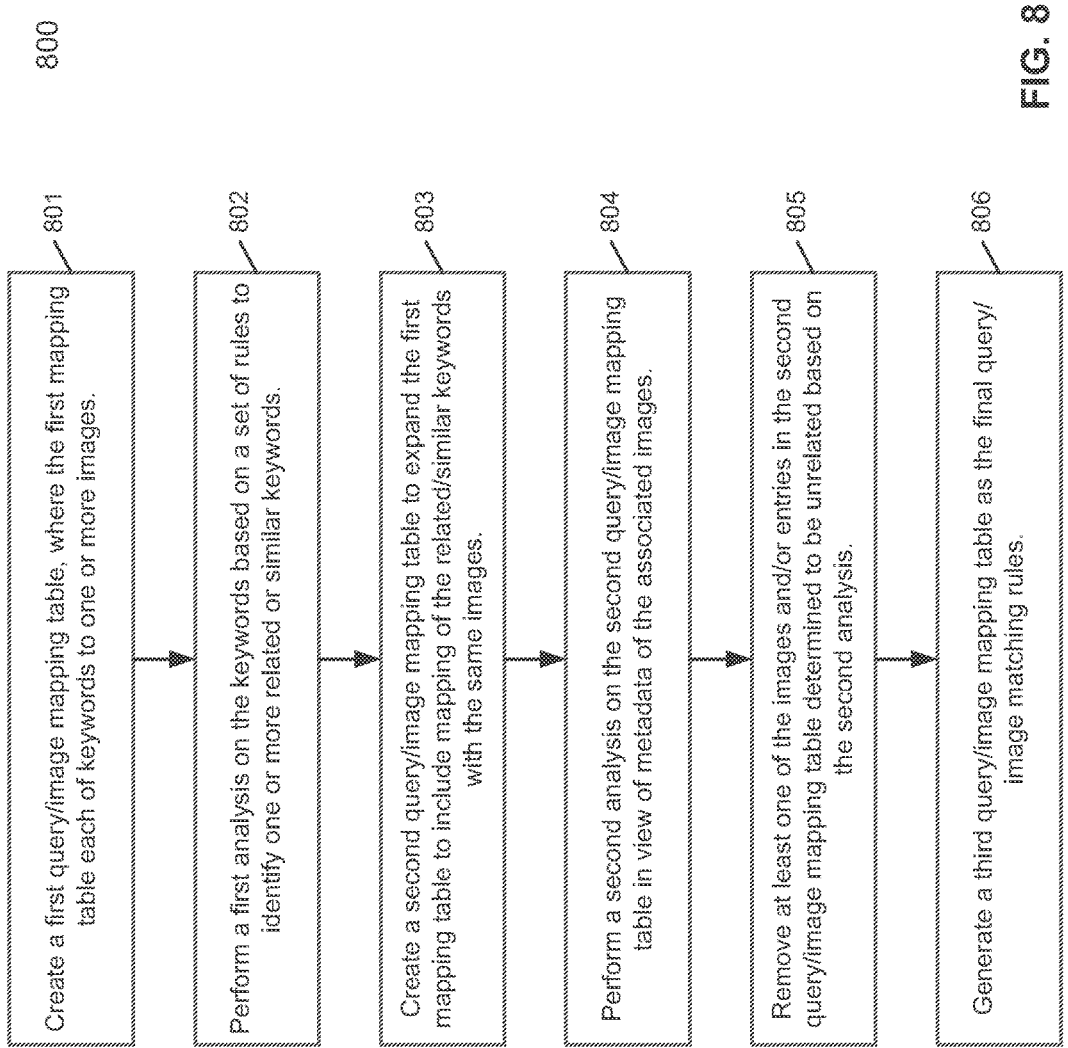

|  | Image 1 1421 | | | | | Image 2 | |
|---|---|---|---|---|---|---|---|
|  | Matching Quality | Click-Through Rate | Image Quality | Image Style | ... | Overall | ... |
| Content Item 1 | 0.6 | 0.03 | 0.9 | 0.7 | ... | 0.48 | ... |
| Content Item 2 | 0.8 | 0.05 | 0.19 | 0.4 | ... | 0.29 | ... |
| 1401 ... | 1402 ... | 1503 ... | 1404 ... | 1405 ... | 1406 ... | 1410 ... | 1422 ... 1423 ... |

FIG. 14

METHOD FOR DYNAMICALLY MATCHING IMAGES WITH CONTENT ITEMS BASED ON KEYWORDS IN RESPONSE TO SEARCH QUERIES

FIELD OF THE INVENTION

Embodiments of the present invention relate generally to search content. More particularly, embodiments of the invention relate to search content with matching images based on keywords.

BACKGROUND

Most search engines typically perform searching of Web pages during their operation from a browser running on a client device. A search engine receives a search term entered by a user and retrieves a search result list of Web pages associated with the search term. The search engine displays the search results as a series of subsets of a search list based on certain criteria. General criteria that is used during a search operation is whether the search term appears fully or partly on a given webpage, the number of times the search string appears in the search result, alphabetical order, etc. Further, the user can decide to open a link by clicking on the mouse button to open and browse. Some of the user interactions with the search results and/or user information may be monitored and collected by the search engine to provide better searches subsequently.

Typically, in response to a search query, a search is performed to identify and retrieve a list of content items. The content items are then returned to a search requester. A conventional search engine would return most of the content items as is without modifying. Some of the content items in the search result are just plain text or description, which may deem to be unattractive or boring. Sometimes content in a search result would be more presentable or attractive if the content items are prepared with certain images that are related to the content items. However, it is quite challenge to match appropriate images with content items.

BRIEF DESCRIPTION OF THE DRAWINGS

Embodiments of the invention are illustrated by way of example and not limitation in the figures of the accompanying drawings in which like references indicate similar elements.

FIGS. 3A-3B are examples of query-image matching tables according to certain embodiments of the invention.

FIGS. 7A-7B are diagrams illustrating examples of mapping data structures according to certain embodiments of the invention.

FIG. 8 is a flow diagram illustrating a process for generating query-image mapping rules according to one embodiment of the invention.

FIG. 14 is a block diagram illustrating an example of a scoring matrix for determining matching scores according to one embodiment of the invention.

DETAILED DESCRIPTION

Figure 1A:
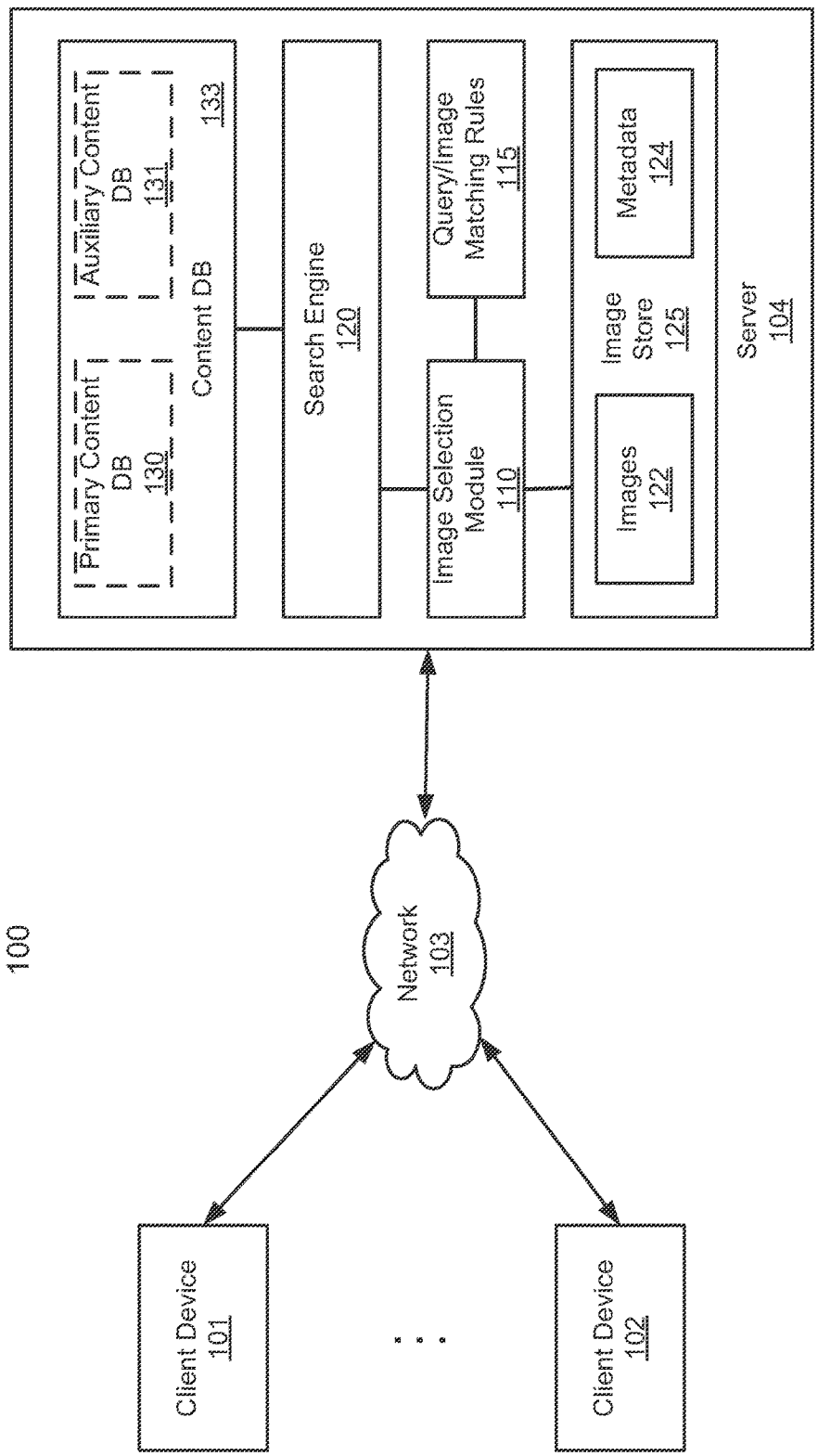
FIGS. 1A and 1B are block diagram illustrating an example of system configuration for matching images with content items according to some embodiments of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, in order to provide an efficient mechanism to match content items with images, a set of query-image (query/image) matching rules (also referred to as keyword/image rules) is configured to map each of a set of predetermined keywords to one or more image identifiers (IDs) identifying one or more images. The set of predetermined keywords may be identified as the keywords that are more likely be used in search queries. Such keywords may be identified based on an analysis or tracking of user searching activities or search history, which may be compiled for a period of time.

Subsequently when a search query is received from a client device for searching content, a search is performed in a content database or via content server to retrieve a list of content items. In addition, an analysis is performed on the query to determine one or more keywords associated with the query. The determined keywords may be the keywords included in the search query. The determined keywords may further include certain keywords that are semantically similar or have the same meaning of the keywords originally in the search query (e.g., synonymous words or phrases). Based on the keywords, a list of one or more images are identified using a set of query/image matching rules. The identified images are then incorporated with at least some of the content items. For example, an image may be utilized as a background or complementary image of a content item. The content items integrated with the images are then returned as part of search result to the client device. As a result, the search result may appear to be more attractive or not to be boring.

According to one aspect of the invention, in order to compile the set of query/image matching rules, a first query/image matching table (also referred to as a preliminary query/image matching table) is initially constructed representing an initial query image matching rules. The first query/image matching table includes multiple matching entries. Each matching entry maps a keyword to one or more image IDs that identify one or more images, where the images have been previously collected, for example, using an image collection system (e.g., image Web crawlers). A first analysis is then performed on the keyword of each of the matching entries in the first query/image table to identify one or more additional keywords that are related or semantically similar to the keyword of the matching entry (also referred to as expanded keywords).

For each of the additional keywords, an additional matching entry (also referred to as an expanded matching entry) is created to map the additional keyword to the same set of one or more images of the corresponding original keyword to generate a second query/image matching table (also referred to as an expanded query/image matching table). For each of the additional or expanded matching entries added in the second query/image table, a second analysis is performed to filter or identify any image that the corresponding keyword does not sufficiently describe or relate to the image in view of metadata associated with the images and/or the keyword. The identified image or images are then removed from the additional matching entries to generate a third query/image matching table (also referred to as a final query matching table). If there is no image associated with the keyword after the filtering process, that particular additional or expanded entry may be removed. The third query/image matching table is then utilized at runtime to match and incorporate images with content items found in response to a search query, based on one or more keywords associated with the search query.

According to another aspect of the invention, in response to a search query received from a client device for searching content, the search query is analyzed to determine one or more first keywords. A search or lookup operation is performed in an image-to-keyword (image/keyword) matching table or data structure based on the first keywords. The query/image mapping table includes multiple entries and each entry maps an image ID identifying an image to one or more second keywords. For each of the images identified in the image/keyword mapping table, a ranking process is performed to determine a matching degree between the first keywords and the second keywords. The images identified in the image/keyword mapping table are then ranked or sorted based on the matching degrees. Each of the matching degrees may be preassigned with a weight factor. Thus, a degree of the first keywords matching the second keywords falls within a predetermined category, a corresponding one of the weight factor is assigned. A matching score representing the matching degree may be calculated at the end for sorting or ranking purposes. The sorted or ranked images having a matching degree higher than a predetermined threshold may be utilized as image candidates to be assigned and/or integrated with the content items retrieved from the content database or content server.

According to another aspect of the invention, in response to a search query having one or more search terms, a first search is conducted in a content database or content server to identify and retrieve a list of first content items that are related to the one or more search terms. A second search is performed in an image store or image server to identify and retrieve a list of one or more images that are related to the search terms. For each of the images identified by the second search, a matching score is calculated between the image and each of the first content items based on a context of the content item and metadata associated with the image. For each of the first content items, the images are then ranked based on the matching scores between the images and the corresponding content item. One of the images is then selected from the list of ranked images to be associated with the content item. The selected image is incorporated with the associated content item (e.g., as a background image). As a result, a list of second content items having at least a portion of the images incorporated with at least a portion of the first content items is generated and returned to the client device.

Figure 1B:
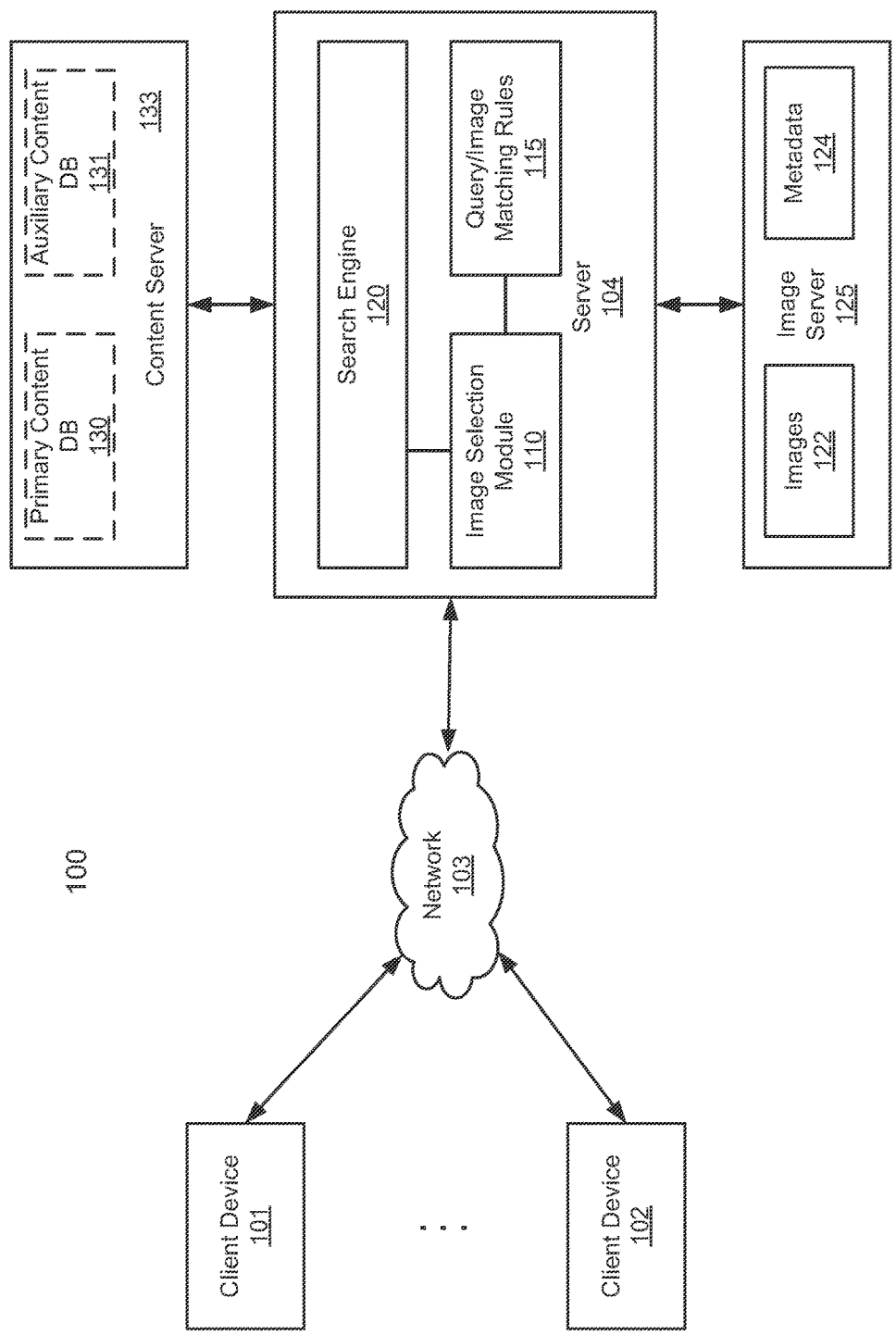

FIGS. 1A and 1B are block diagrams illustrating an example of system configuration for matching images with content items according to some embodiments of the invention. Referring to FIG. 1A, system 100 includes, but is not limited to, one or more client devices 101-102 communicatively coupled to server 104 over network 103. Client devices 101-102 may be any type of client devices such as a personal computer (e.g., desktops, laptops, and tablets), a "thin" client, a personal digital assistant (PDA), a Web enabled appliance, a Smartwatch, or a mobile phone (e.g., Smartphone), etc. Alternatively, client devices 101-102 may be frontend systems or servers with respect to server 104 as a backend or application server. Network 103 may be any type of networks such as a local area network (LAN), a wide area network (WAN) such as the Internet, or a combination thereof, wired or wireless.

Server 104 may be any kind of servers or clusters of servers, such as Web or cloud servers, application servers, backend servers, or a combination thereof. In one embodiment, server 104 includes, but is not limited to, search engine 120, image selection module 110, and query/image matching rules 115. Server 104 further includes an interface (not shown) to allow a client such as client devices 101-102 to access resources or services provided by server 104. The interface may include a Web interface, an application programming interface (API), and/or a command line interface (CLI).

For example, a client, in this example, a user application of client device 101 (e.g., Web browser, mobile application, or search utility software of a frontend server/system), may send a search query to server 104 and the search query is received by search engine 120 via the interface over network 103. In response to the search query, search engine 120 extracts one or more keywords (also referred to as search terms) from the search query. Search engine 120 performs a search in content database 133, which may include primary content database 130 and/or auxiliary content database 131, to identify a list of content items that are related to the keywords. Primary content database 130 (also referred to as a master content database) may be a general content database, while auxiliary content database 131 (also referred to as a secondary content database) may be a special content database. Search engine 120 returns a search result page having at least some of the content items in the list to client device 101 to be presented therein. Search engine 120 may be a Baidu® search engine available from Baidu, Inc. or alternatively, search engine 120 may represent a Google® search engine, a Microsoft Bing™ search engine, a Yahoo® search engine, or some other search engines.

A search engine, such as a Web search engine, is a software system that is designed to search for information on the World Wide Web. The search results are generally presented in a line of results often referred to as search engine results pages. The information may be a mix of Web pages, images, and other types of files. Some search engines also mine data available in databases or open directories. Unlike web directories, which are maintained only by human editors, search engines also maintain real-time information by running an algorithm on a web crawler.

Web search engines work by storing information about many web pages, which they retrieve from the hypertext markup language (HTML) markup of the pages. These pages are retrieved by a Web crawler, which is an automated Web crawler which follows every link on the site. The search engine then analyzes the contents of each page to determine how it should be indexed (for example, words can be extracted from the titles, page content, headings, or special fields called meta tags). Data about web pages are stored in an index database for use in later queries. The index helps find information relating to the query as quickly as possible.

When a user enters a query into a search engine (typically by using keywords), the engine examines its index and provides a listing of best-matching web pages according to its criteria, usually with a short summary containing the document's title and sometimes parts of the text. The index is built from the information stored with the data and the method by which the information is indexed. The search engine looks for the words or phrases exactly as entered. Some search engines provide an advanced feature called proximity search, which allows users to define the distance between keywords. There is also concept-based searching where the research involves using statistical analysis on pages containing the words or phrases you search for. As well, natural language queries allow the user to type a question in the same form one would ask it to a human.

The usefulness of a search engine depends on the relevance of the result set it gives back. While there may be millions of web pages that include a particular word or phrase, some pages may be more relevant, popular, or authoritative than others. Most search engines employ methods to rank the results to provide the "best" results first. How a search engine decides which pages are the best matches, and what order the results should be shown in, varies widely from one engine to another.

Referring back to FIG. 1A, according to one embodiment, in response to a search query received at server 104 from a client device, in this example, client device 101, search engine 120 performs a search in content database 133, such as primary content database 130 and/or auxiliary content database 131, to generate a list of content items (referred to as first content items). Each of the content items may be associated with a particular Web page of a particular Web site of a particular content provider via a uniform resource link (URL) and/or a uniform resource identifier (URI). In one embodiment, primary content database 130 stores general content items that have been collected by network crawlers (e.g., unsponsored content). Auxiliary content database 135 stores specific or special content items that are associated with specific, known, or predetermined content providers (e.g., sponsored content). Alternatively, content database 133 may be implemented as a single database without distinguishing primary content database 131 from auxiliary content database 132.

Network crawlers or Web crawlers are programs that automatically traverse the network's hypertext structure. In practice, the network crawlers may run on separate computers or servers, each of which is configured to execute one or more processes or threads that download documents from URLs. The network crawlers receive the assigned URLs and download the documents at those URLs. The network crawlers may also retrieve documents that are referenced by the retrieved documents to be processed by a content processing system (not shown) and/or search engine 120. Network crawlers can use various protocols to download pages associated with URLs, such as hypertext transport protocol (HTTP) and file transfer protocol (FTP).

In addition, according to one embodiment, image selection module 110 searches based on the keywords associated with the search query in query/image matching rules 115 to identify a list of images or image IDs identifying the images that are related to the keywords. Query/image matching rules 115 may be implemented in a variety of data structures such as a table or database. Based on the image IDs, a list of image candidates can be identified and retrieved from images 123 stored in image store 125, where image store 125 may also store image metadata 124 describing images 122. As described above, images 122 and their respective metadata 124 may be obtained by one or more image crawlers that are designed to craw the networks to collect images as well as their surrounding metadata. Images 122 may be non-privileged, non-copyrightable, properly licensed images, or any other authorized images. The image candidates may be ranked based on a relevancy score or matching degree between the keywords and the image candidates, which may be determined in view of image metadata 124. For each of the content items found in content database 133, an image is selected from the list of image candidates to be associated with the content item. The selected image may be incorporated with the content item to generate an incorporated content item. For example, the selected image may serve as a background or complementary image to the content item. The list of incorporated content items and images is returned to client device 101 as part of a search result.

According to one embodiment, query/image matching rules 115 may be previously compiled and generated prior to receiving the search query (e.g., offline). The set of query/image matching rules 115 is configured to map each of a set of predetermined keywords to one or more image IDs identifying one or more images. The set of predetermined keywords may be identified as the keywords that are more likely be used in search queries. Such keywords may be identified based on an analysis or tracking of user searching activities or search history, which may be compiled for a period of time.

Subsequently when a search query is received by search engine 120 from a client device for searching content, a search is performed in content database 133 to retrieve a list of content items. In addition, an analysis is performed, for example, by image selection module 110, on the query to determine one or more keywords associated with the query. The determined keywords may be the keywords included in the search query. The determined keywords may further include certain keywords that are semantically similar or have the same meaning of the keywords originally in the search query (e.g., synonymous words or phrases). Based on the keywords, a list of one or more images are identified from image store 125 using the set of query/image matching rules 115. The identified images are then incorporated with at least some of the content items. For example, an image may be utilized as a background image of a content item. The content items integrated with the images are then returned as part of search result to the client device. As a result, the search result may appear to be more attractive or not to be boring.

Note that the configuration of server 104 has been described for the purpose of illustration only. Other architectures or configurations may also be applicable. For example, as shown in FIG. 1B, content database 133 may be maintained and hosted in a separate server as a content server over a network. Similarly, image store 125 may be maintained and hosted in a separate server as an image server. Servers 133 and 125 may be Web servers, application servers, or backend servers. Content server 133 and/or image server 125 may be organized and provided by the same entity or organization as of server 104. Alternatively, content server 133 and/or image server 125 may be maintained or hosted by separate entities or organizations (e.g., third-party providers), which are responsible for collecting contents in content databases 130-131 and images 122 and their metadata 124. Furthermore, image selection module 110 may be implemented as a separate system, for example, as an image selection system or server communicatively coupled to server 104 via an API or over a network.

Figure 2:
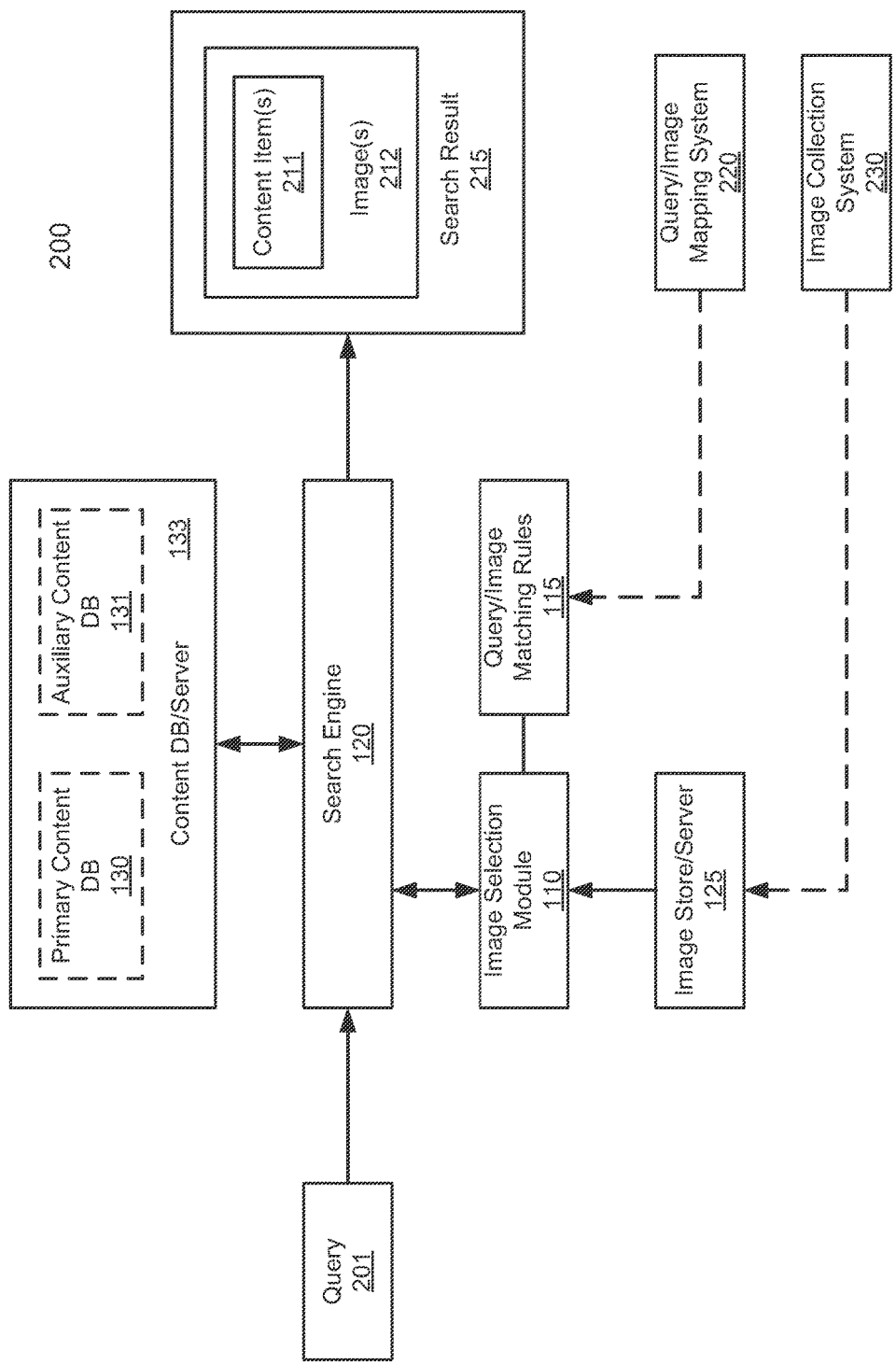
FIG. 2 is a block diagram illustrating a system for matching images with content items according to one embodiment of the invention.

FIG. 2 is a block diagram illustrating a system for matching images with content items according to one embodiment of the invention. System 200 may be implemented as part of system 100 of FIGS. 1A-1B. Referring to FIG. 2, when search query 201 is received from a client device (e.g., client device 101 of FIG. 1), search engine 120 performs a first search in content database or content server 133 to identify and retrieve a first list of content items (e.g., first content items) based on one or more keywords or search terms associated with search query 201. In addition, search engine 120 communicates with image selection module 110 to identify a list of images from image store or image sever 125 based on the keywords associated with search query 201 using a set of query/image matching rules 115. Search engine 120 and/or image selection module 110 may perform an analysis on the query to derive a list of keywords that are included in search query 201 and/or similar to the keywords in search query 201 (e.g., semantically similar terms, synonymous terms). The searches perform in content database/server 133 and/or image store/server 125 may be performed on the list of expanded keywords.

In one embodiment, image selection module 110 and/or query/image matching rules 115 may be integrated with search engine 120. Query/image matching rules 115 may be previously configured or compiled, for example, by query/image mapping system 220. Query/image mapping system 220 may be hosted in a separate serer communicatively coupled to system 200 via an API or over a network. Query/image mapping system 200 may include a user interface to allow a user or an administrator to configure a set of query/image matching rules, which may then be expanded and ranked using a predetermined algorithm by processing logic. Further details of query/image mapping system 200 will be described further below.

Similarly, images stored in image store/server 125 may be collected by image collection system 230, which may be a separate server communicatively coupled to system 200 over a network. Query/image mapping system 220 and/or image collection system 230 may be operated by the same or different entity or organization as of system 200. In this example, images may be cached and stored in a local image store with respect to system 200 (e.g., local to server 104). Alternatively, images may be maintained by a designated server associated with image collection system 230, with which image selection module 110 communicates to identify and retrieve the list of images via an application programming interface (API).

Based on the list of images retrieved from image store/server 125, image selection module 110 ranks the images according to a ranking algorithm. Some of the images are then matched with some of the content items identified and retrieved from content database/server 133. The matched content items and images are then integrated into integrated content items. In one embodiment, an image may be selected as a background image or a complementary image to a content item. For example, content item 211 may be a description or text and image 212 may be selected to be a background image for content item 211. Image 212 is selected based on the matching techniques described throughout this application to complement or describe content item 211, or vice versa, in an appropriate manner. For example, the content of content item 211 is related to the content as shown in image 212, or vice versa. The integrated images 212 and content items 211 may be returned to the client device as a part of search result 215.

Note that content database/server 133 may include primary content database 130 and auxiliary content database 131. Primary content database 130 may also be implemented or maintained in a separate content server, referred to as a primary content server. Similarly, auxiliary content database 131 may be implemented or maintained in a separate content sever, referred to as an auxiliary content server. The content items obtained from both content databases 130-131 may be matched with images obtained from image store/server 125 using a variety of matching formulas, which will be described details further below. Alternatively, only content items obtained from one of primary content database 130 and auxiliary content database 131 will be matched with images obtained from image store/server 125. For example, content items obtained from auxiliary content database 131 (e.g., sponsored content) will be matched with the images obtained from image store/server 125, while content items obtain from primary content database 130 (e.g., general content) will be returned to the client device without modification as part of search result 215.

According to one embodiment, in response to search query 201 received from a client device, one or more keywords are determined based on search query 201, where the keywords may include those in search query 201 or those expanded based on an analysis on search query 201. Based on the keywords, a lookup operation or search is performed in query/image matching rules 115, which may be implemented in a variety of data structures, such as, for example, a database or a table. For the purpose of illustration, query/image matching rules 115 is referred to as a query/image matching table.

Query/image matching table 115 includes a number of matching entries. Each match entry maps one or more keywords to one or more image IDs that identify one or more images stored in image store/server 125. Based on the keywords obtained based on search query 201, a list of one or more image IDs may be obtained from query/image matching table 115. Based on the image IDs, the corresponding images are obtained from image store/server 125 as image candidates. The image candidates are then ranked and matched using one or more predetermined ranking and/or matching algorithms, which will be described in details further below. The top ranked images may then be selected to be associated with the content items for integration as part of search result 215. Note that some or all of the components or modules as shown in FIG. 2 may be implemented in software, hardware, or a combination thereof.

FIGS. 3A-3B are examples of query-image matching tables according to certain embodiments of the invention. Referring to FIG. 3A, query/image matching table 300 may represent query/image matching rules 115 of FIGS. 1A-1B and 2 as described above. In one embodiment, query/image matching table 300 includes a number of matching entries. Each of the matching entry maps one or more keywords 301 to one or more image IDs 302, where image IDs 302 identify the corresponding images in an image store or image server, such as image store/sever 125. Matching table 300 is indexed based on the keywords. In this example, a first entry maps a term "flower" to images 1-5. A second entry maps a term "Beijing flower" to image 1 only. A third entry maps a term "Shanghai flow" to image 2. A fourth entry maps a term "flower delivery" to images 1-2 and 4. Thus, if a search query contains "Beijing flower," images 1-5 may be identified. However, image 1 may have a higher ranking.

Referring now to FIG. 3B, which is an example of an alternative embodiment of a matching table, this is an image-keyword (image/keyword) matching table that may be utilized as part of query/image matching rules 115. In this example, image/keyword matching table 350 includes a number of matching entries. Each matching entry maps an image ID 351 to one or more keywords 352. Matching table 350 is indexed based on image IDs. Both tables 300 and 350 may be utilized interchangeably. For example, table 300 may be used to identify all of the images that are related to one or more keywords. For each of the images that are identified via table 300, a matching degree between keywords 352 and the keywords in the search query is determined to rank images identified by image IDs 351. For example, a ranking score may be calculated based on a number of keywords in the search query match keywords 352. If the keywords in a search query exactly match those in field 352, the corresponding image identified in field 351 would have the highest matching degree or matching score. Fewer matched keywords between the search query and field 352 lead to lower matching degree or matching score. Semantically matched keywords (e.g., not actually matched, but synonymous words or words having the same or similar meanings) may have the lowest matching degree or matching score.

Figure 4:
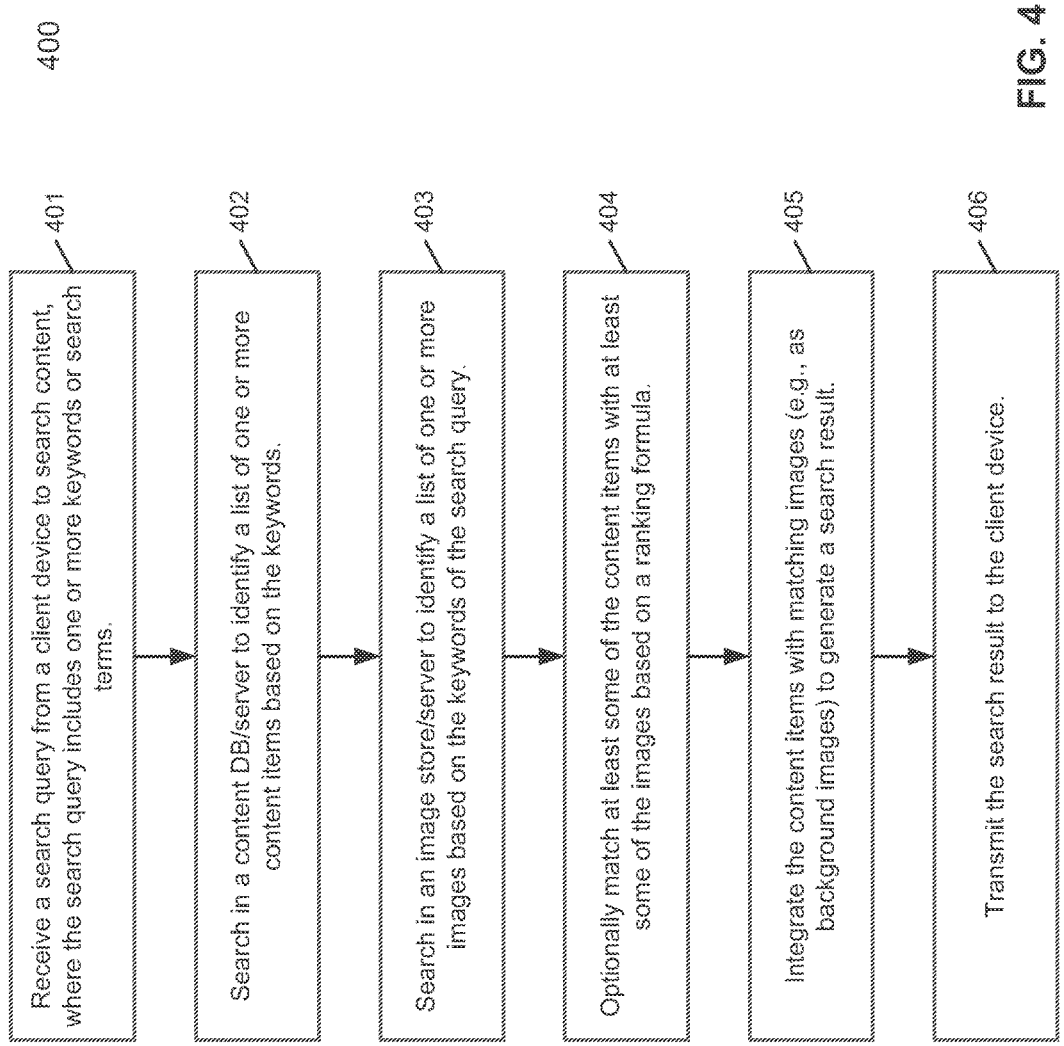
FIG. 4 is a flow diagram illustrating a process for matching images with content according to one embodiment of the invention.

FIG. 4 is a flow diagram illustrating a process for matching images with content according to one embodiment of the invention. Process 400 may be performed by processing logic which may include software, hardware, or a combination thereof. For example, process 400 may be performed by server 104 of FIGS. 1A-1B or system 200 of FIG. 2. Referring to FIG. 4, at block 401, processing logic receives a search query from a client device to search content. The search query includes one or more keywords or search terms. In response to the search query, at block 402, processing logic searches in a content database or via a content server to identify a list of one or more content items based on the keywords. At block 403, processing logic searches in an image store or via an image server to identify a list of one or more images based on the keywords. At block 404, processing logic optionally matches at least some of the content items with at least some of the images based on a ranking formula. At block 405, processing logic integrates at least some of the content items with matching images (e.g., as background images) to generate a search result. At block 406, the search result is transmitted to the client device.

Figure 5:
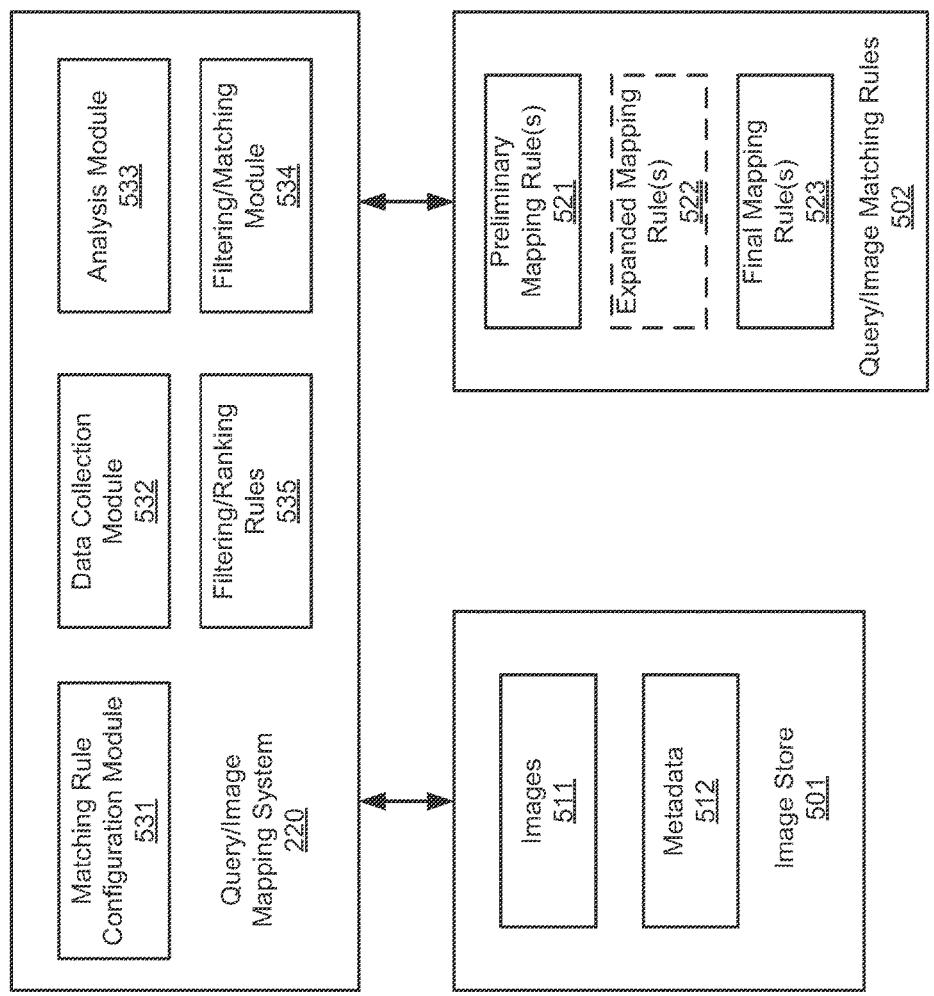
FIG. 5 is a block diagram illustrating an example of a system for matching images with content according to one embodiment of the invention.

FIG. 5 is a block diagram illustrating an example of a system for matching images with content according to one embodiment of the invention. System 500 may be implemented as part of system 200 of FIG. 2. Referring to FIG. 5, system 500 includes, but is not limited to, query/image mapping system 220, image store 501, and query/image matching rules 502 (also referred to as keyword/image matching rules). In one embodiment, query/image mapping system 200 is utilized to configure and generate a set of query/image matching rules 502 to map certain keywords to images stored in image store 501.

Image store 501 may be maintained locally or remotely in a designated server over a network. Image store 501 may represent image store/server 125 of FIGS. 1A-1B. The keywords utilized in mapping in query/image matching rules may be the keywords that are more likely used in search queries. Image store 501 stores images 511 and their respective metadata 512. Query/image matching rules 502 include preliminary mapping rules 521, optional expanded mapping rules 522, and final mapping rules 523. These rules 521-523 may be implemented in a form of mapping or matching tables as described above. Final mapping rules 523 may be utilized as part of query/image matching rules 115 of FIGS. 1A-1B.

In one embodiment, query/image mapping system 220 includes matching rule configuration module 531, data collection module 532, analysis module 533, filtering and matching module 534, and a set of filtering/ranking rules 535. Modules 531-534 may be implemented in software, hardware, or a combination thereof. In one embodiment, configuration module 531 may be utilized to configure preliminary mapping rules 521, for example, in response to a user request via a user interface. Preliminary mapping rules 521, in this example, preliminary mapping table 521, include a number of mapping entries. Each mapping entry maps a keyword to one or more image IDs identifying one or more of images 511 stored in image store 501. Images 511 and metadata 512 may be periodically collected and updated by data collection module 532. Data collection module 532 may employ some Web crawlers to craw and collect the images and their surrounding information or metadata 512.

In one embodiment, a user or an administrator may configure preliminary mapping table 521 via a configuration interface (e.g., Web interface). Based on preliminary mapping table 521, analysis module 533 performs an analysis on the preliminary mapping between keywords and images to create one or more additional or expanded mapping entries. An expanded mapping rules or table 522 is generated to include the expanded mapping entries. Based on expanded matching table 522, filtering/matching module 534 performs a filtering operation on the additional or expanded entries based on a set of filtering and ranking rules 535 to verify the mapping and to remove any image that is unrelated to the corresponding keyword. Final mapping rules or table 523 is then generated, which can be utilized as part of query/image matching rules 115 of FIGS. 1A-1B.

Figure 6:
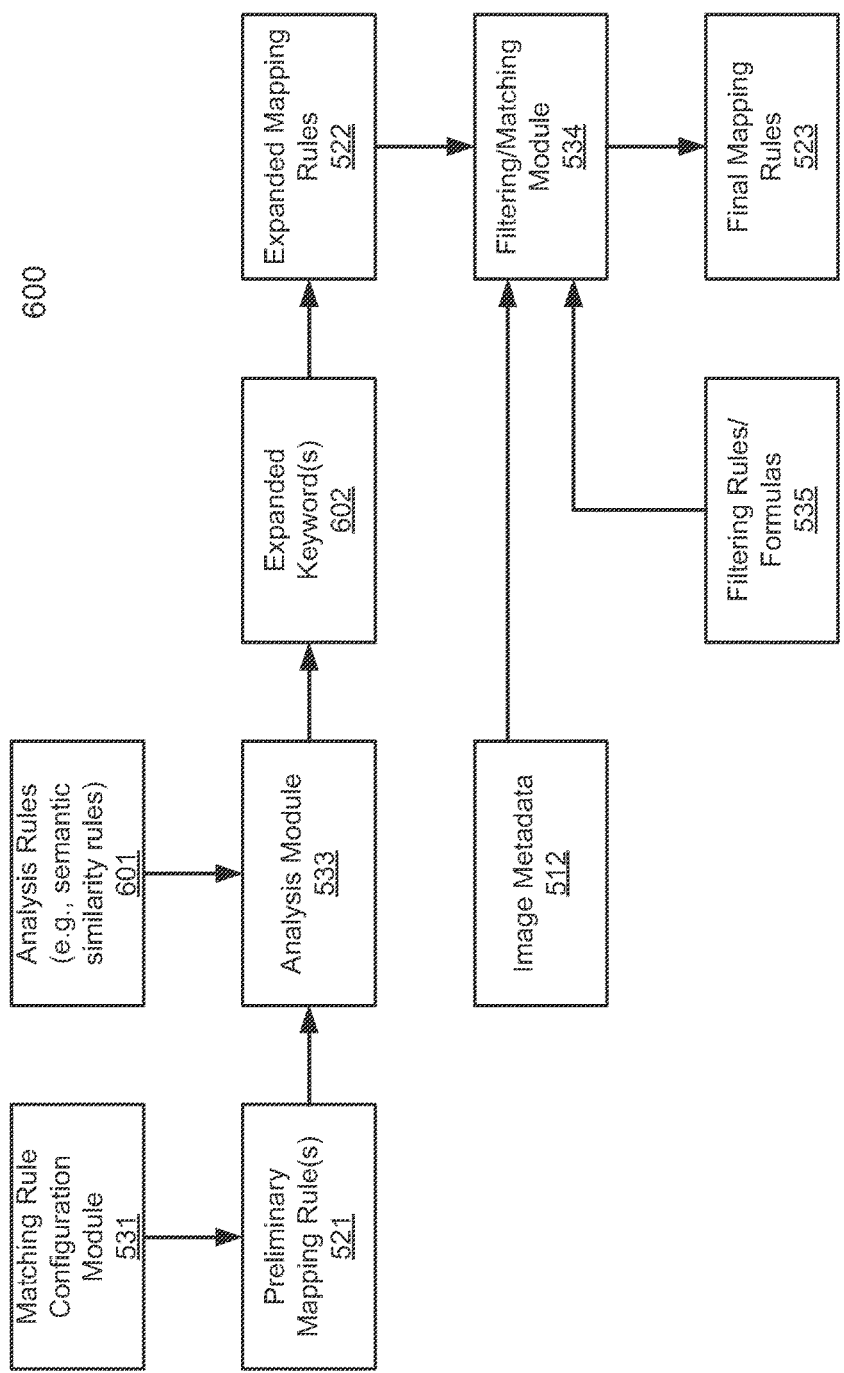
FIG. 6 is a processing flow for generating query-image mapping rules according to one embodiment of the invention.

FIG. 6 is a processing flow for generating query-image mapping rules according to one embodiment of the invention. Referring to FIG. 6, preliminary mapping rules 521 are generated via rule configuration module 531. For example, a user or an administrator may log onto to system 600 and configure via a graphical user interface (GUI) associated with rule configuration module 531. The user may specify a particular keyword to be mapped to one or more images using corresponding image IDs. An example of preliminary mapping rules 521 is shown in FIG. 7A, for example, in a form of mapping table 700.

Referring now to FIG. 7A, mapping table 700 includes a number of mapping entries (also referred to as matching entries). Each entry maps a keyword (e.g., single keyword) 701 to one or more image IDs 702 that identify one or images stored in an image store such as image store 501 of FIG. 5. In this example, an entry maps the term "flower" to images 1-5. Thus, if a search query contains the term of "flower," images 1-5 may be identified as image candidates that are considered as related to the term of "flower."

Referring back to FIG. 6, based on preliminary mapping rules 521, analysis module 533 performs an analysis on the keywords contained in the entries of preliminary mapping rules 521 using a set of analysis rules 601 such as semantic similarity rules 601. Such an analysis may include a latent semantic analysis. For at least some of the keywords in preliminary mapping rules 521, one or more additional keywords that are related to the keywords, referred to herein as expanded keywords 602, are identified based on the analysis. The expanded keywords 602 may be those having the same or similar meanings to an original keyword in preliminary mapping rules 521 (e.g., semantically similar or synonymous words).

A latent semantic analysis (LSA) is a technique in natural language processing, in particular distributional semantics, of analyzing relationships between a set of documents ad the terms they contain by producing a set of concepts related to the documents and terms. LSA assumes that words that are close in meaning will occur in similar pieces of text. A matrix containing word counts per paragraph (rows represent unique words and columns represent each paragraph) is constructed from a large piece f text and a mathematical technique called singular value decomposition (SVD) is used to reduce the number of rows while preserving the similarity structure among columns. Words are then compared by taking the cosine of the angle between the two vectors (or the dot product between the normalizations of the two vectors) formed by any two rows. Values close to 1 represent very similar words while values close to 0 represent very dissimilar words.

For each of expended keywords 602, an additional entry is created to map the expanded keyword to the same image IDs of the corresponding original keyword. As a result, expanded mapping rules 522 are created from preliminary mapping rules 521. FIG. 7B shows an example of an expanded mapping table 750 that is expanded from preliminary mapping table 700 of FIG. 7A. Referring now to FIGS. 7A-7B, entry 721 represents an original entry in preliminary mapping table 700. After an analysis is performed on keyword "flower" of entry 721, additional keywords "Beijing Flower," "Shanghai Flower," and "Flower Delivery" are identified as semantically related to the original term "flower." As a result, additional or expanded entries 722-724 are created from preliminary mapping table 700 to become expanded mapping table 750. Each of expanded entries 722-724 is mapped to the same image IDs as of the original entry 721. In this example, all entries 721-724 are mapped to images 1-5. Expanded mapping table 750 represents expanded mapping rules 522 of FIG. 6.

Referring back to FIG. 6, from expanded mapping rules 522, filtering/matching module 534 performs a filtering operation on the expanded entries (e.g., entries 722-724 of FIG. 7B) in view of metadata 512 associated with the matched images (e.g., metadata for images 1-5), using a set of filtering rules or formulas 535. The purpose of filtering operations is to verify the expanded entries to make sure the matching quality of the expanded entries. In one embodiment, the filtering operation removes any image that was mapped to an original keyword, but it is not really or actually related to an expanded keyword. As a result, final mapping rules 523 are created, for example, as table 300 shown in FIG. 3A. Referring now to FIG. 3A, as a result of filtering operations, some of the images associated with the entries for "Beijing Flower," "Shanghai Flower," and "Flower Delivery" have been removed. If there is no more image to be associated with a particular entry after the filtering operations, that entry may be removed from the final mapping table.

In one embodiment, metadata 512 include a variety of information or data describing the images, where metadata may be obtained or collected by a designated data collection module or system, such as data collection module 532 of FIG. 5. For example, image metadata may be collected at the time of a corresponding image is obtained. The image metadata may include a source from which the image is collected and a time of the collection. A source from which an image is obtained may be a Web page or a document in which the image is attached. An address such as a universal resource locator (URL) may of the source page may be collected. In addition, an analysis may be performed on the content of the source page to determine the content possibly represented by the image. An image recognition may also be performed on the image to determine the content of the image (e.g., whether the image is about a person, an object, landscape, texts, or a combination thereof). In addition, attributes of the image, such as an aspect ratio, pixel counts, brightness, contrast, time of the image taken, and style (e.g., landscape vs. portrait), may also be collected. Further, prior user interactions with the image and/or keyword in the past (e.g., a click through rate) may also be determined based on the history interactions associated with the image. These information may be compiled as part of metadata of the images.

Based on the metadata, the filtering operation is to determine whether a particular keyword sufficiently describing the image by matching the semantic meanings between the keyword and the metadata of a particular image. For example, if a keyword appears in a source page from which the image was collected, the keyword is related to the image. Similarly, if a keyword describes at least a portion of content of the image in response to an image recognition, the keyword may be related. If it is determined that a keyword does not sufficiently describes a particular image or vice versa based on the analysis on the metadata, that particular image may be removed. If it is determined that the prior user interactions with a particular image is below a predetermined threshold (e.g., fewer user interactions, less user interest or unpopular), that particular image may be removed. Note that throughout this application, the terms of "matching rule," "mapping rule," "matching table," and "mapping table" are interchangeable terms for the purposes of illustration. However, they can be implemented in a variety of data structures or formats.

FIG. 8 is a flow diagram illustrating a process for generating query-image mapping rules according to one embodiment of the invention. Process 800 may be performed by processing logic which may include software, hardware, or a combination thereof. For example, process 800 may be performed by system 500 of FIG. 5. Referring to FIG. 8, at block 801, processing logic creates a first query/image mapping table (e.g., preliminary mapping table), where the first query/image mapping table maps each of the keywords to one or more images. At block 802, a first analysis is performed on each of the keywords in the first query image mapping table based on a set of rules to identify one or more additional keywords that are related or similar to the original keyword. At block 803, a second query/image mapping table (e.g., expanded mapping table) is created to include additional entries for the additional keywords. The additional entries map the additional keywords to the same images as of the corresponding original keywords. At block 804, a second analysis (e.g., a filtering/matching operation) is performed on the second query/image mapping table in view of metadata of the associated images. At block 805, at least one image is removed from an entry or at least one entry is removed from the second mapping table that is determined to be unrelated based on the second analysis. At block 806, a third query/image mapping table is generated as the final query/image mapping table.

Figure 9:
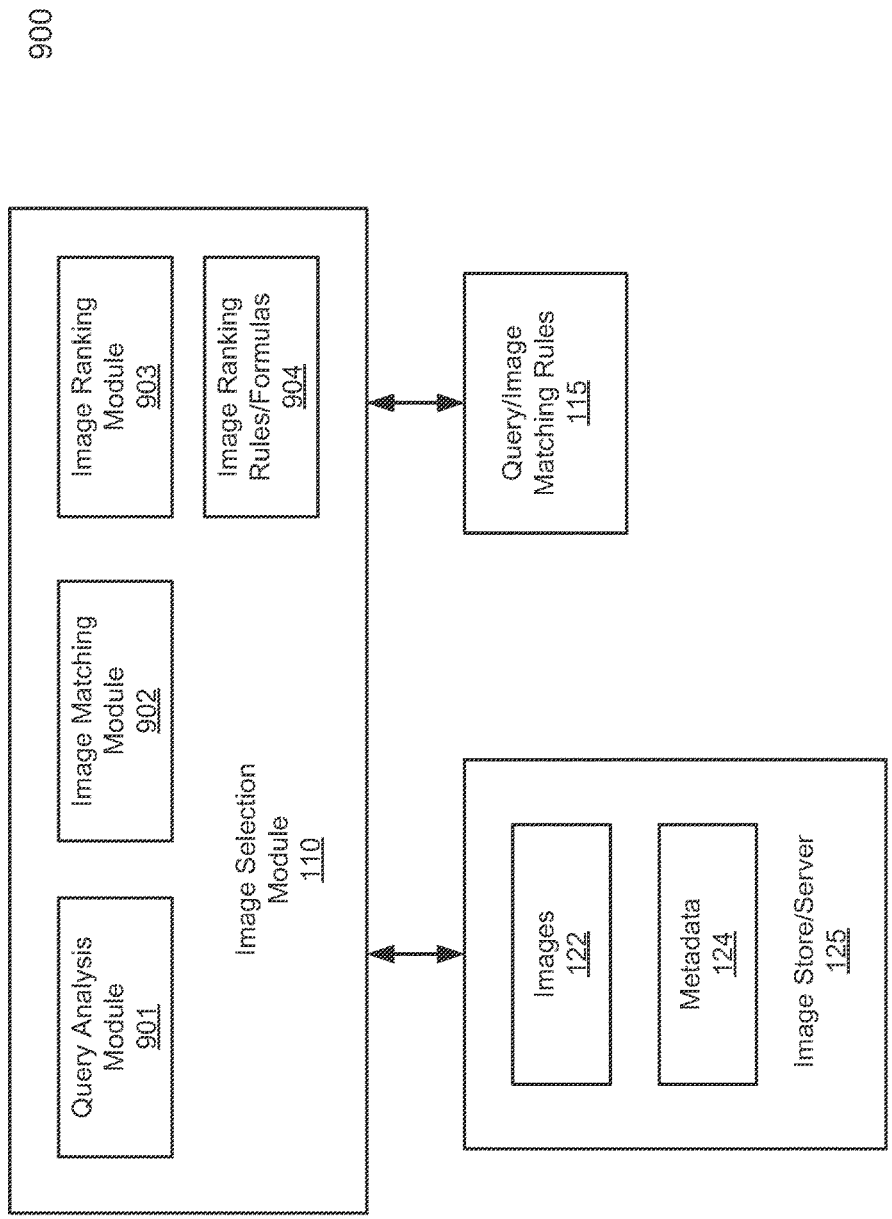
FIG. 9 is a block diagram illustrating an example of a query-image matching system according to another embodiment of the invention.

FIG. 9 is a block diagram illustrating an example of a query-image matching system according to another embodiment of the invention. System 900 may be implemented as part of system 200 of FIG. 2. Referring to FIG. 9, system 900 may be incorporated with system 200 of FIG. 2. Alternatively, system 900 may be implemented as a standalone system or a server communicatively coupled to system 200 of FIG. 2, for example, via an API or a communication protocol over a network or a connection. In one embodiment, system 900 is responsible for identifying, ranking, and selecting images to be matched with content items found in response to a search query at runtime, in response to a search query for searching content.

In one embodiment, image selection module 110 includes query analysis module 901, image matching module 902, image ranking 903, and image ranking rules or formulas 904, where some or all of these modules may be implemented in software, hardware, or a combination thereof. In one embodiment, in response to a search query received from a client device for searching content, the search query is analyzed by query analysis module 901 to determine one or more first keywords. A search or lookup operation is performed by image matching module 902 in an image-to-keyword (image/keyword) matching table or data structure 115 based on the first keywords. The query/image mapping table 115 includes multiple entries and each entry maps an image ID identifying an image to one or more second keywords, or vice versa (e.g., matching tables as shown in FIGS. 3A-3B).

For each of the images identified in the image/keyword mapping table 115, a ranking process is performed by image ranking module 903 to determine a matching degree between the first keywords and the second keywords. The images identified in the image/keyword mapping table 115 are then retrieved from image store/server 125. The images may be ranked or sorted based on the matching degrees, for example, using an image ranking rule or formula 904. Image ranking rule or formula 904 may be previously configured (e.g., by a user via a configuration interface, or automatically by a rule engine, not shown) and maintained in a persistent storage device (e.g., hard disk). In one embodiment, each of the matching degrees may be preassigned with a weight factor. Thus, a matching degree of the first keywords matching the second keywords falls within a predetermined category, a corresponding one of the weight factor is applied. A matching score representing a matching degree may be calculated, for example, by image ranking module 903 or a matching score calculator (not shown), at the end for sorting or ranking purposes. The sorted or ranked images having a matching degree higher than a predetermined threshold may be utilized as image candidates. At least some of the image candidates may be selected to be assigned and/or integrated with the content items retrieved from the content database or content server.

Figure 10:
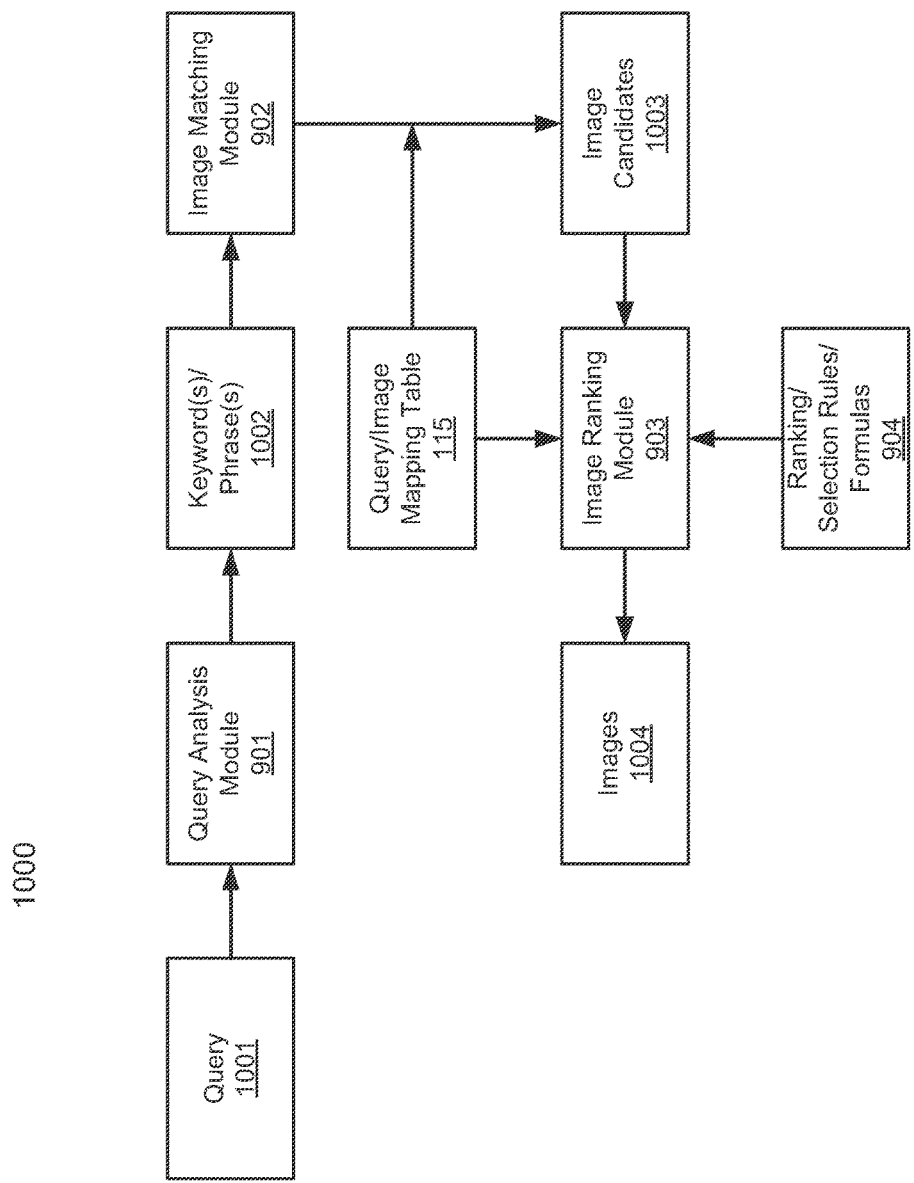
FIG. 10 is a process flow diagram illustrating a process for matching images with content in response to a search query according to one embodiment of the invention.

FIG. 10 is a process flow diagram illustrating a process for matching images with content in response to a search query according to one embodiment of the invention. Process flow 1000 may be performed by system 900 of FIG. 9. Referring to FIG. 10, in response to search query 1001, query analysis module 901 performs an analysis on keywords contained in search query 1001 to generate a set of one or more keywords 1002. Keywords 1002 may include the exact keyword(s) included in search query 1001, as well as, the expanded keywords (e.g., semantically related or similar terms, synonymous terms). Query analysis module 901 may perform a latent semantic analysis on the keyword(s) included in search query 1001 to derive a set of one or more expanded keywords. The expanded keywords may include those terms that certain amount of users likely use to specify or seek content having a particular meaning, for example, based on prior user interactions over a period of time (e.g., user interaction history log compiled over the Web).

Based on keywords 1002, image matching module 902 performs a search or lookup operation in query/image mapping table 115 (e.g., mapping tables as shown in FIGS. 3A-3B) to identify image candidates 1003 that deem to be related to keywords 1002. Image matching module 902 performs a lookup operation in query/image mapping table 115 based on keywords 1002 to retrieve image IDs from the entries that match at least one of keywords 1002. Based on image candidates 1003, image ranking module 903 determines a matching degree between one or more keywords of search query 1001 and the keywords in the matching entries of query/image mapping table 115. In one embodiment, ranking module 903 determines how many of the keywords 1002 associated with search query 1001 are included in the matching entries of query/image mapping table 115.

An entry having all the keywords of a search query would yield the highest matching degree. An entry having more keywords that match the keywords in a search query (e.g., including only a portion) would have a higher matching degree. On the other hand, if a matching entry does not include any of the keywords in a search query, but it includes a related or similar term, its corresponding matching degree will be lower. In addition, a matching score representing a matching degree may be calculated based on ranking rules or formulas 904 for each pair of matching between keywords and images. A higher match degree may be assigned with a higher matching score. Different matching degrees may be associated with different weight factors that are used in ranking formula 904 in calculating the corresponding matching scores.

Figure 11:
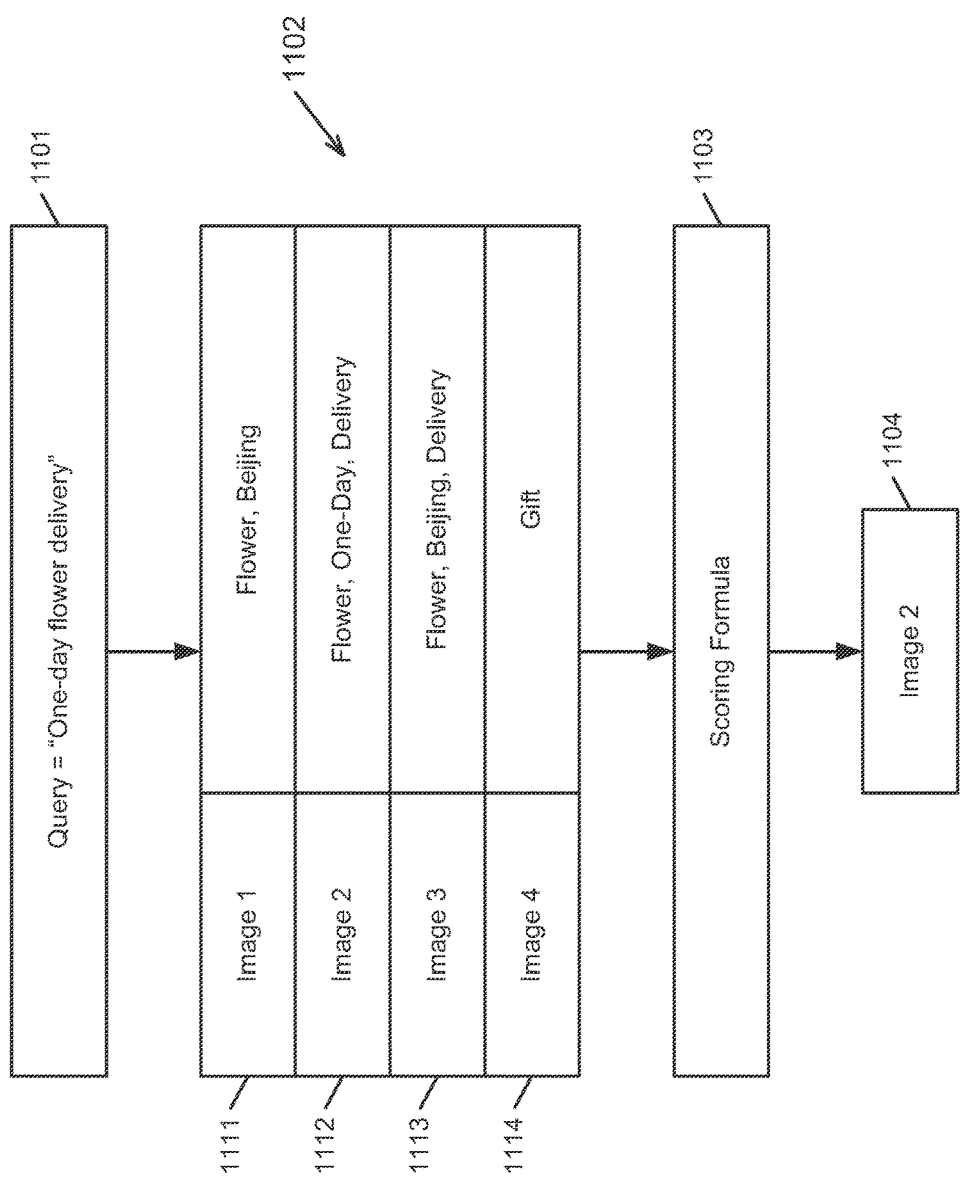
FIG. 11 is a diagram illustrating an example of a process of ranking images in response to a search query according to one embodiment of the invention.

FIG. 11 is a diagram illustrating an example of a process of ranking images in response to a search query according to one embodiment of the invention. Referring to FIGS. 9 and 11, when search query 1101 is received, an analysis is performed by query analysis module 901. In this example, search query 1101 includes three terms: "one-day," "flower," and "delivery." Based on these keywords, a lookup operation is performed in query/image mapping table 1102 by image matching module 902, where query/image mapping table 1102 may represent the image candidates identified from query/image mapping table 115.

In this example, the mapping table 1102 includes matching entries 1111-1114 that map images 1-4 to various terms or keywords. Based on the keywords "one-day," "flower," and "delivery," images 1111-1114 are ranked based on a number of keywords in query/image mapping table 1102 that match the keywords in search query 1101, using scoring formula 1103. As described above, more keywords that are matched between search query 1101 and entries 1111-1114 of mapping table 1102, the higher matching score will be. In this example, since entry 1113 has the exact match of keywords as of search query 1101, image 2 will be assigned the highest score based on scoring formula 1103 as image 1104 selected to be associated with a content item for integration.

According to one embodiment, a matching score calculated by a matching score calculator or ranking module based on scoring formula 1103 may be determined based on a number of keywords that are matched between a search query and the keywords of a particular entry corresponding to an image, a number of keywords included in the search query, and/or a number of keywords included in that particular entry. In one particular embodiment, a matching score of a particular image=(a number of matched keywords/a number of keywords in a search query)*(a number of matched keywords/a number of keywords in a match entry corresponding to the image).

Figure 12:
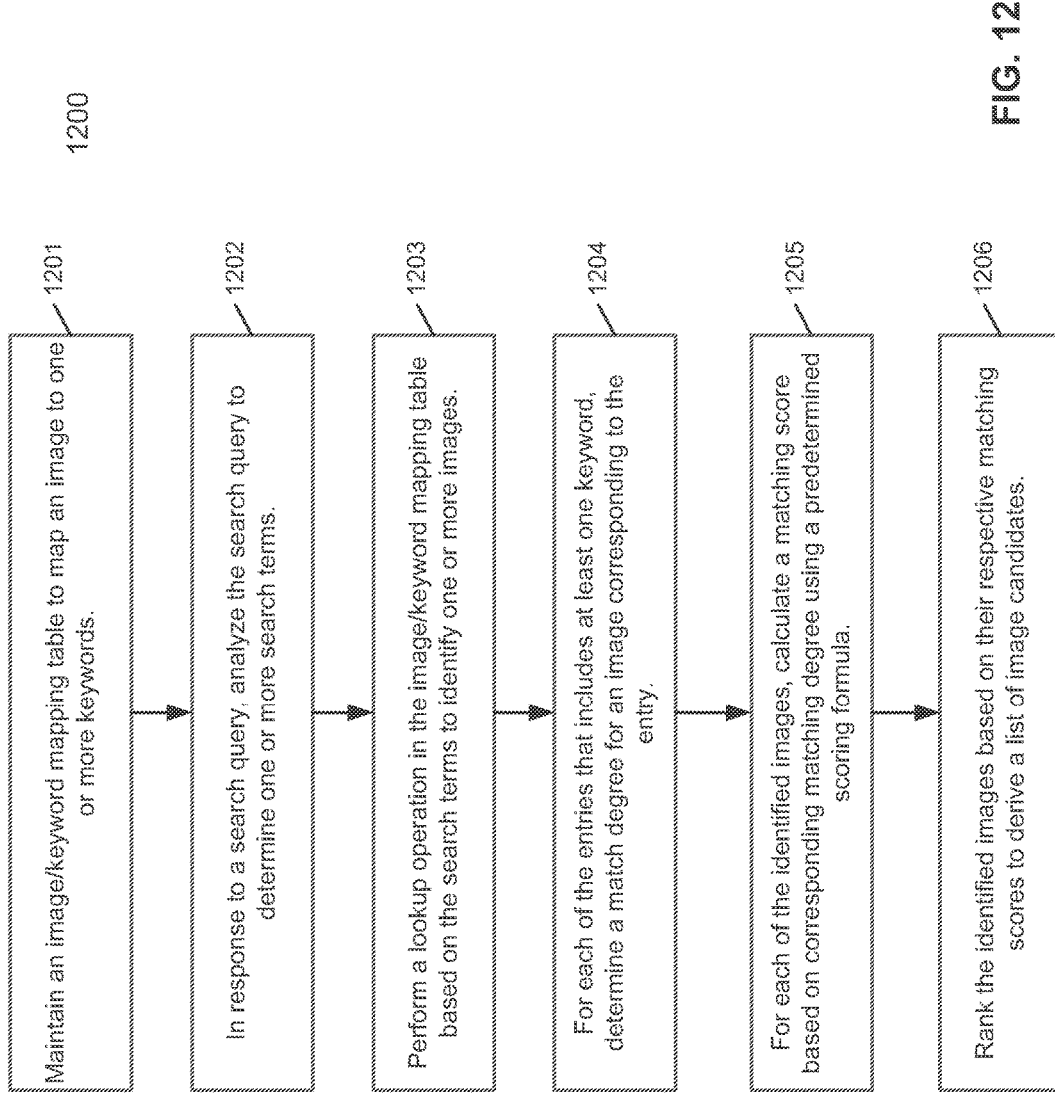
FIG. 12 is a flow diagram illustrating a process for matching images with content items based on keywords according to one embodiment of the invention.

FIG. 12 is a flow diagram illustrating a process for matching images with content items based on keywords according to one embodiment of the invention. Process 1200 may be performed by processing logic which may include software, hardware, or a combination thereof. For example, process 1200 may be performed by system 900 of FIG. 9. Referring to FIG. 12, at block 1201, processing logic maintains an image/keyword mapping table to map an image to one or more keywords. The image/keyword mapping table includes a number of mapping entries, each entry maps an image or an image ID identifying an image to one or more keywords. At block 1202, in response to a search query, processing logic analyzes the search query to determine one or more search terms or keywords. At block 1203, processing logic performs a lookup operation in the image/keyword mapping table base on the search terms to identifying one or more images. At block 1204, for each of the entries that include at least one search term, processing logic determines a match degree for an image corresponding to the entry. At block 1205, for each of the identified images, processing logic calculates a matching score based on the corresponding match degree using a predetermined scoring formula. At block 1206, the images are ranked based on the associated matching scores to derive a list of image candidates.

The matching techniques for matching images with keywords are based on the analysis on the keywords of search queries and/or metadata of the images. According to some embodiments, when the images are ranked, in addition to matching based on keywords of queries and metadata of the images, the ranking may be determined further based on the surrounding information and/or metadata of the content items or the content items themselves found in response to the search queries. The rationale behind this approach is that if the images and the content items came from a similar source or have a similar background of history, these images and content items are likely related or have a good match.

According to another aspect of the invention, in response to a search query having one or more search terms, a first search is conducted in a content database or via a content server to identify and retrieve a list of first content items that are related to the one or more search terms. A second search is performed in an image store or image server to identify and retrieve a list of one or more images that are related to the search terms. For each of the images identified by the second search, a matching score is calculated between the image and each of the first content items based on a context of the content item and metadata associated with the image. For each of the first content items, the images are then ranked based on the matching scores between the images and the corresponding content item. One of the images is then selected from the list of ranked images to be associated with the content item. The selected image is incorporated with the associated content item (e.g., as a background image). As a result, a list of second content items having at least a portion of the images incorporated with at least a portion of the first content items is generated and returned to the client device.

Figure 13:
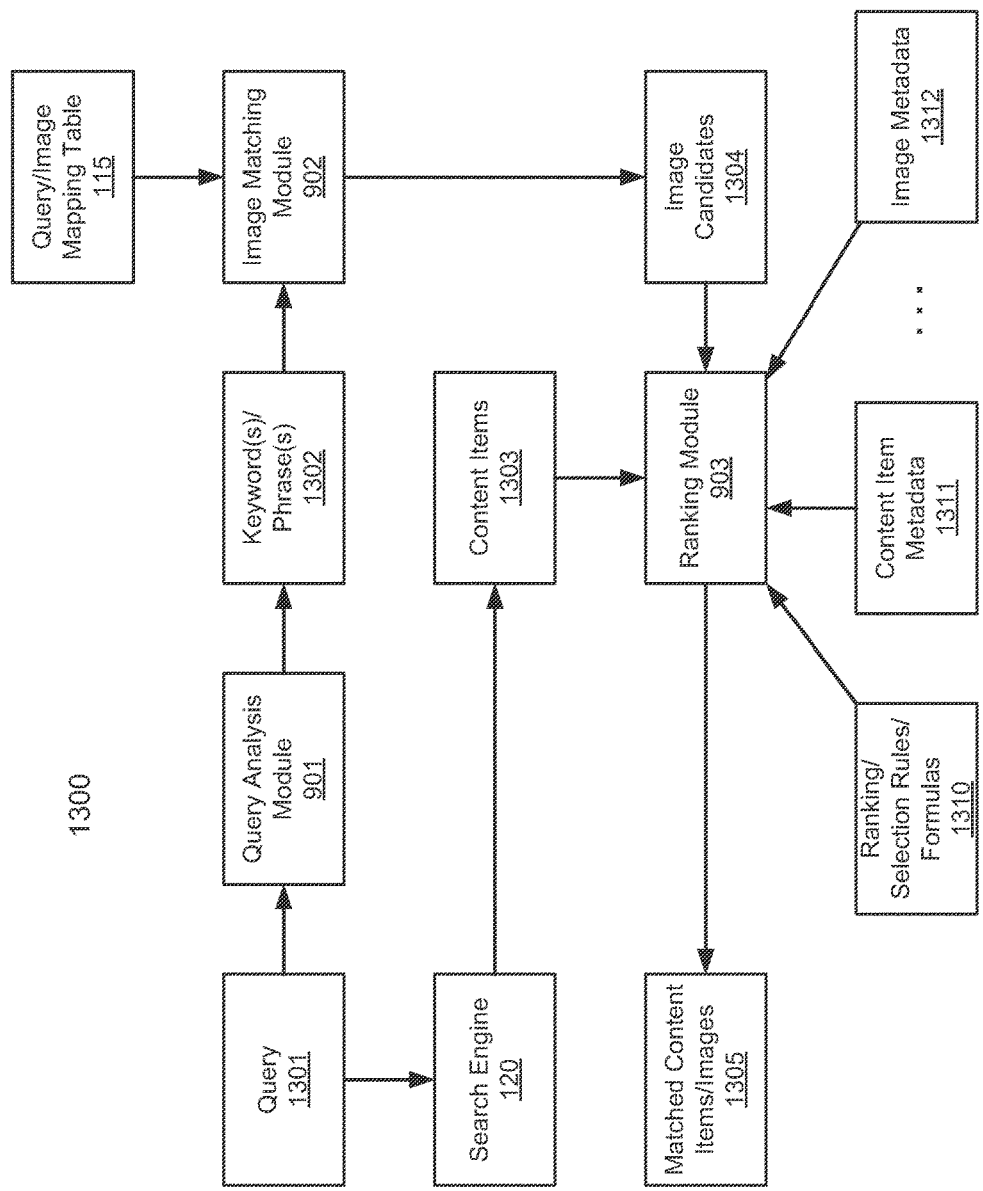
FIG. 13 is a block diagram illustrating an example of a query-image matching system according to another embodiment of the invention.

FIG. 13 is a block diagram illustrating an example of a query-image matching system according to another embodiment of the invention. System 1300 may be implemented as part of matching systems described above. Certain components having the same or similar functionalities as of those described above will be referenced using the same reference numbers. The description set forth above with respect to the components with the same reference numbers will be equally applied herein.

Referring to FIG. 13, according to one embodiment, when search query 1301 is received, search engine 120 performs a search in a content database or via a content server to identify and retrieve a list of content items 1303, which may be incorporated into a search result. Content items 1303 may be retrieved from a general content database/server, an auxiliary content database/server (e.g., sponsored content, special content), or both. Meanwhile, query analysis module 901 performs an analysis on the keywords or search term of search query 1301 to derive a list of keywords 1302. Based on keywords 1302, image matching module 902 searches or looks up in query/image mapping table or rules 115 to identify a list of image candidates 1304, as described above.

Based on image candidates 1304 and content items 1303, ranking module 903 is to perform a ranking process based on content items 1303, metadata 1311 associated with content items 1303, image candidates 1304, and metadata 1312 associated with image candidates 1304. The ranking process may be performed using a predetermined ranking formula 1310 based on the relationships amongst content items 1303, metadata 1311 associated with content items 1303, image candidates 1304, and metadata 1312 associated with image candidates 1304. As a result of the ranking process, matched pairs 1305 of a content item and an image are generated. The matched content item and image may be integrated into integrated content items. For example, a content item (e.g., a text) may be superimposed onto a matched image, where the matched image serves as a background image. Alternatively, the matched image is placed next to the content item to complement the content item. A search result having the integrated content items therein is transmitted to a client device that initiated the search query 1301.

In one embodiment, in ranking the image candidates 1304 in view of content items 1303, all information or data surrounding image candidates 1304 and content items 1303 are considered by ranking module 903, collectively referred to as content item metadata 1311 and image metadata 1312. A score matrix is computed based on a matching score between each of content items 1303 and each of image candidates 1304. In calculating a matching score (also referred to as a ranking score) for each pair of one of the content items and one of the image candidates, an individual matching score is calculated for each of predetermined attributes or parameters associated with the content item and the image candidate of the pair. The individual matching scores may be determined based on corresponding data obtained from content item metadata 1311 and/or image metadata 1312, using an individual scoring formula associated with the corresponding attribute or parameter. An overall matching score is then determined based on the individual matching scores using an overall scoring formula. If more than one match have an identical matching score, a tie-breaking formula may be applied to assign different images to different content items. Alternatively, an image may be assigned to multiple content items, dependent upon the specific situation.

The attributes or parameters obtained from metadata 1311-1312 used in scoring the content items and image candidates can be a variety of data, which may be collected using a data collection module (not shown) over a period of time. In one embodiment, a matching score between a content item and an image candidate can be determined in part based on a matching quality between the content item and the image candidate. The term of "matching quality" may refer to whether a content item describes the content recognized from an image being matched. For example, the matching quality may be determined based on whether the title and/or description match the content presented by the image. The content represented by an image may be determined via an image recognition process performed by an image recognition module or system (not shown). The matching quality may be determined further based on whether the content item and the image were obtained from the same or similar sources (e.g., same address such as URL, same domain, or provided by the same or similar providers).

In one embodiment, a matching score between a content item and an image candidate can be determined in part based on prior user interactions between the content item and the image (e.g., prior user access patterns or behaviors), which is referred to as a click-through rate. The prior user interactions may be obtained from a history log of user interactions collected over a period of time by a data collection module or data collection system (not shown). A history log records user interactions with contents and/or images accessed or browsed by users, including information identifying the users (e.g., IP addresses, domain, usernames), how many users have accessed the content items and/or images, the time of the accesses, how long the users stayed at content pages representing the content items and/or images, how frequent the users visited the content pages. The click-through rate may further record the clicks on a content item, an image, or both the content item and the image represented together by users.

In one embodiment, a matching score between a content item and an image candidate can be determined in part based on image quality of an image. The image quality may include, but is not limited to, the size of the image (e.g., height and width), resolution (e.g., pixel counts), aspect ratio, layout (e.g., landscape, portrait), the time when the image was taken (e.g., whether the image is up-to-day). The matching score may further be based on an innovation or style of the image, such as, for example, brightness, contrast, camera settings, or any other metadata associated with the image.

FIG. 14 is a block diagram illustrating an example of a scoring matrix for determining matching scores according to one embodiment of the invention. Referring to FIG. 14, scoring matrix 1400 may be compiled or generated by a ranking module, such as tanking module 903 of FIG. 13. Referring to FIG. 14, it is assumed content items 1401 have been identified and retrieved by search engine based on one or more keywords associated with a search query from a content database or content server (e.g., sponsored content).

In addition, a list of image candidates 1421-1423 have been identified that are related to certain keywords associated with the search query, as described above.

In one embodiment, for each of the content items 1401, individual matching scores for a set of predetermined attributes or parameters 1402-1406 are calculated. The individual matching scores 1402-1406 may be calculated using a specific or corresponding individual matching score formula by an individual matching score calculator. As described above, each of the attributes or parameters 1402-1406 may be associated with a specific weight factor or coefficient in calculating the individual matching score. Although not shown, the individual matching scores may also be calculated for each of images 1422-1423. An overall score 1410 is calculated for each of the content items 1401 for each of the images 1421-1423. The overall scores of images 1421-1423 calculated for a particular content item are then used to select one of images 1421-1423 to be associated with that particular content item.

In one embodiment, an image having the highest overall matching score for a particular content item is selected to be associated with that content item. For example, it is assumed image 1421 has the highest overall matching score amongst images 1421-1423. Image 1421 may be selected to be associated with content item 1. If the same image has the same highest matching score for more than one content item, in this example, content items 1 and 2, a tie-breaking formula may be applied to resolving the contention. In one embodiment, a sum of all overall matching scores of all images 1421-1423 is calculated for each of the content items 1401. The content item having the highest sum has a higher priority to select the image. Other configurations may exist.

Figure 15:
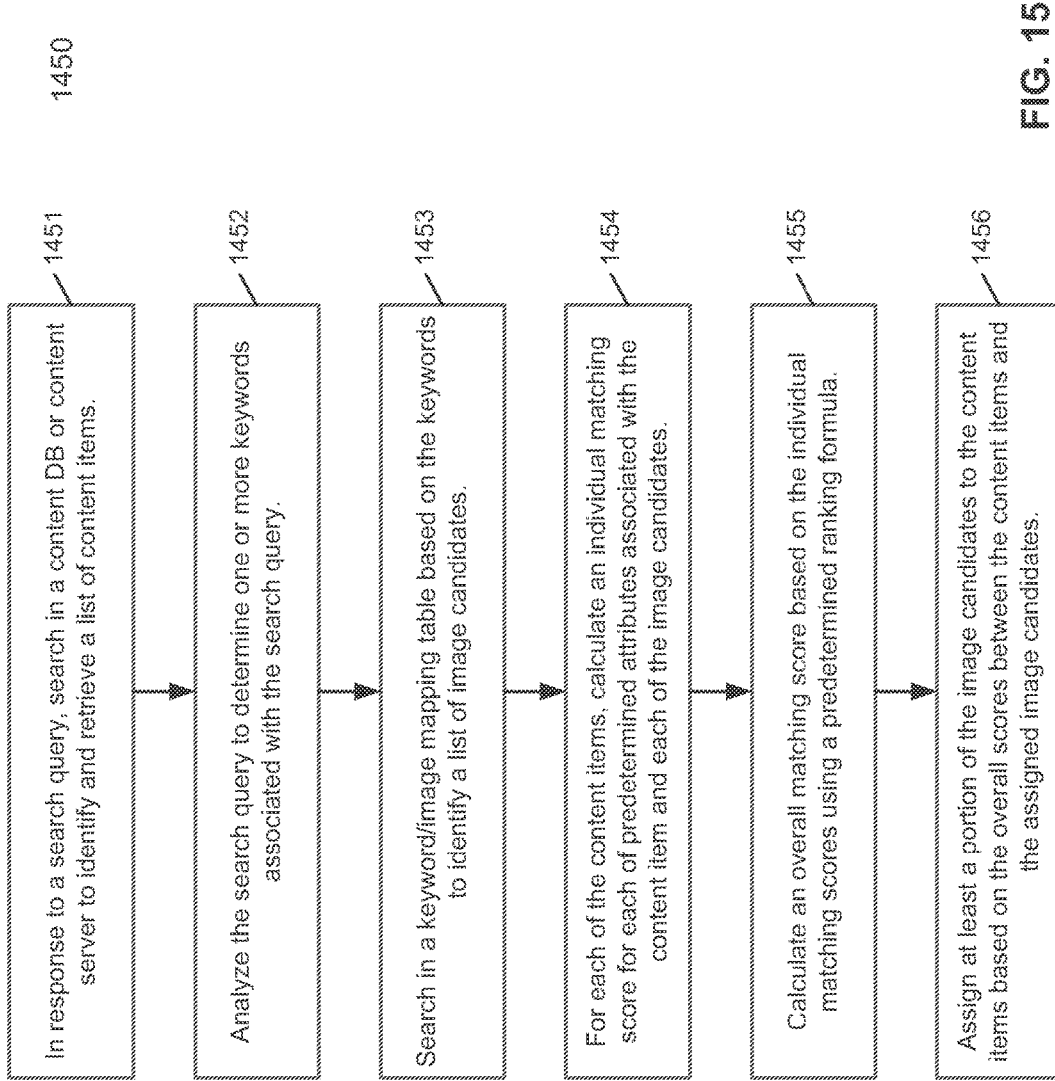
FIG. 15 is a flow diagram illustrating a process for matching images with content items according to another embodiment of the invention.

FIG. 15 is a flow diagram illustrating a process for matching images with content items according to another embodiment of the invention. Process 1450 may be performed by processing logic which may include software, hardware, or a combination thereof. For example, process 1450 may be performed by system 1300 of FIG. 13. Referring to FIG. 15, at block 1451, in response to a search query, processing logic searches in a content database or server to identify and retrieve a list of content items. At block 1452, processing logic analyzes the search query to determine one or more keywords associated with the search query. These keywords may include the keywords contained in the search query and/or the expanded keywords that are related to those keywords. At block 1453, processing logic searches in keyword/image mapping table based on the keywords to identify a list of image candidates.

At block 1454, for each of the image candidates, processing logic calculates an individual matching score for each of the predetermined attributes or parameters (e.g., matching quality, image quality, click-through rate, innovation or style of the images, history of user interactions) associated with the content item and each of the image candidates. At block 1455, processing logic calculates an overall matching score based on the individual matching scores using a predetermined ranking formula. At block 1456, at least a portion of the image candidates is assigned to the content items based on the overall scores between the content items and the assigned image candidates.

The techniques described above can be applied to matching images with sponsored content. One type of the sponsored content is advertisement (Ads). For example, referring back to FIGS. 1A-1B, content database (DB) or server 133 may be an Ads database or Ads server. In another embodiment, primary content DB 130 may store the general content generally available in a public network. Auxiliary content DB 131 may be an Ads DB. Some of the Ads may be just plain texts. By matching and integrating an image with the Ads, for example, as a background image, the Ads may be more appealing or attractive to users. Server 104 may be a Web server for searching content or alternatively, server 104 may be an Ads server.

Figure 16:
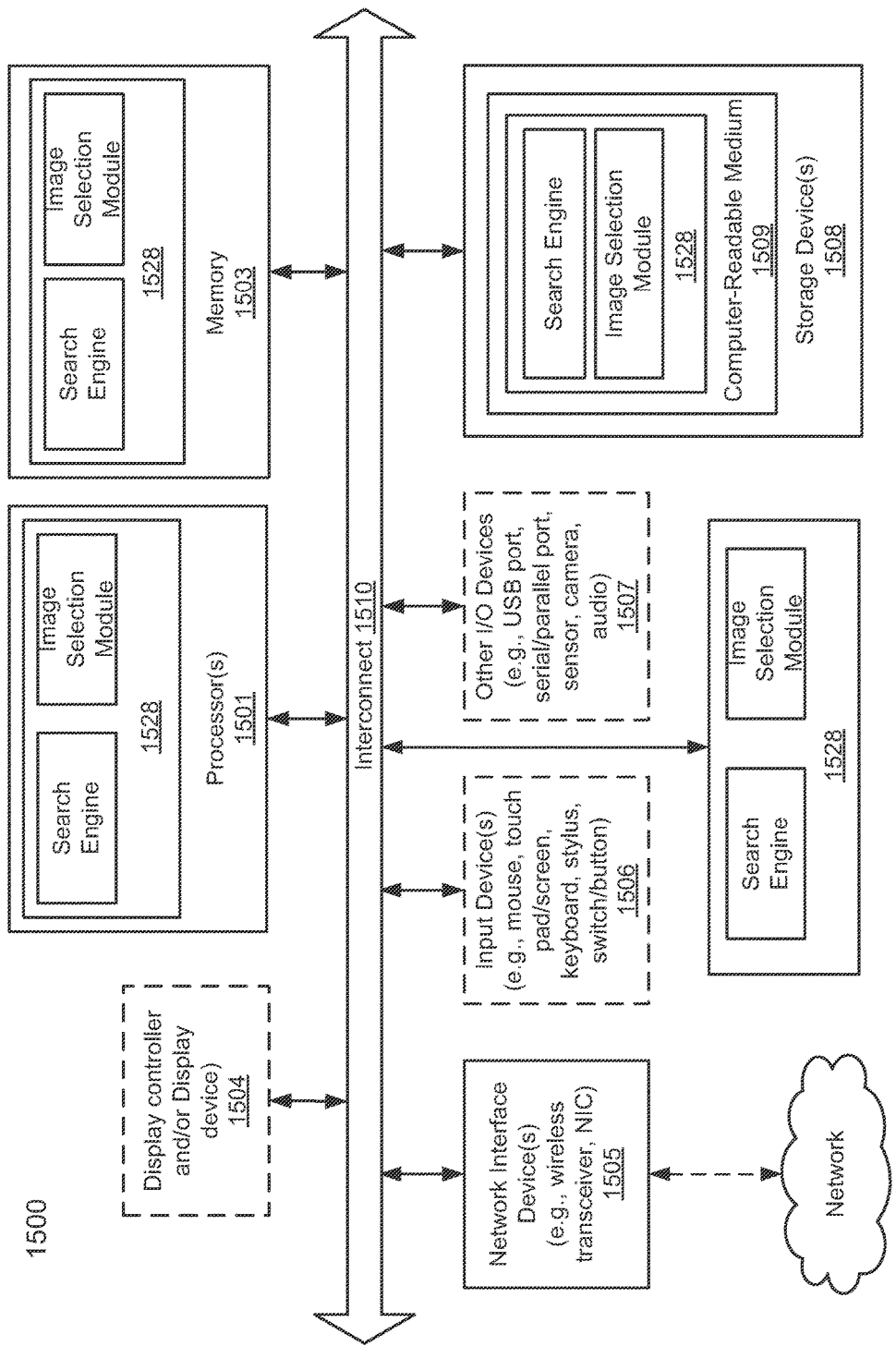
FIG. 16 is a block diagram illustrating a data processing system according to one embodiment.

FIG. 16 is a block diagram illustrating an example of a data processing system which may be used with one embodiment of the invention. For example, system 1500 may represents any of data processing systems described above performing any of the processes or methods described above, such as, for example, a client device or a server described above.

System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may represent any of the components described above, such as, for example, a search engine, an encoder, an interaction logging module as described above. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for matching images with content items based on keywords, the method comprising:

in response to a search query received from a client device for searching web content, determining, by a query analysis module executed by a processor, one or more first keywords from the search query;

performing by a matching module a lookup operation in an image-to-keyword (image/keyword) mapping table based on the first keywords, the image/keyword mapping table including a plurality of entries, each entry mapping an image identifier (ID) identifying an image corresponding to one or more second keywords, wherein the image/keyword mapping table is indexed based on image IDs;

for each of images identified in the image/keyword mapping table, determining by a ranking module a matching degree between the first keywords and the second keywords, wherein the matching degree is determined based on (i) a first ratio of a number of keywords in the first keywords that match the second keywords to a number of keywords in the first keywords, and (ii) a second ratio of the number of matched keywords to a number of keywords in the second keywords, wherein a matching degree with at least a portion of the first keywords matching the second keywords is higher than a matching degree of which none of the first keywords matches any of the second keywords;

ranking by the ranking module a plurality of images identified in the image/keyword mapping table whose second keywords match at least a portion of the first keywords based on the determined matching degrees; and selecting, from the ranked images, by the ranking module one or more image candidates having a matching degree higher than a predetermined threshold, wherein the selected image candidates are integrated with a list of content items.

2. The method of claim 1, further comprising:
performing a search in a content store based on the search query to identifying the list of content items; and
associating at least a portion of the ranked images with at least a portion of the content items based on ranking.

3. The method of claim 2, further comprising:
integrating the at least a portion of the ranked images with the at least a portion of the content items to generate a search result; and
transmitting the search result to the client device, wherein the ranked images are used as background images for the content items.

4. The method of claim 1, wherein determining a matching degree between the first keywords and the second keywords comprises:
determining whether a first entry of the image/keyword mapping table contains third keywords that include all the first keywords of the search query; and
assigning a first predetermined score to a first image associated with the first entry, in response to determining that the third keywords exactly match the first keywords.

5. The method of claim 1, wherein determining a matching degree between the first keywords and the second keywords comprises:
determining whether a second entry of the image/keyword mapping table contains one or more fourth keywords that include a portion of the first keywords of the search query; and
assigning a second predetermined score to a second image associated with the second entry, in response to determining that one or more fourth keywords that match a portion of the first keywords.

6. The method of claim 1, wherein determining a matching degree between the first keywords and the second keywords comprises:
determining whether a third entry of the image/keyword mapping table contains one or more fifth keywords that are semantically similar to at least a portion of the first keywords of the search query; and
assigning a third predetermined score to a third image associated with the third entry, in response to determining that one or more fifth keywords that are semantically similar to at least a portion of the first keywords, wherein the images are ranked based on corresponding scores of the images.

7. The method of claim 1, wherein determining a matching degree between the first keywords and the second keywords comprises:
determining a first number of keywords matched between the first keywords and the second keywords of a first entry in the image/keyword mapping table;
determining a second number of keywords included in the query; and
calculating a matching score representing the matching degree based on the first number of keywords and the second number of keywords.

8. The method of claim 7, further comprising determining a third number of keywords included in the first entry of the image/keyword mapping table, wherein the matching score is calculated further based on the third number of keywords.

9. A non-transitory machine-readable medium having instructions stored therein, which when executed by a processor, cause the processor to perform operations of matching images with content items based on keywords, the operations comprising:
in response to a search query received from a client device for searching web content, determining one or more first keywords from the search query; performing a lookup operation in an image-to-keyword (image/keyword) mapping table based on the first keywords, the image/keyword mapping table including a plurality of entries, each entry mapping an image identifier (ID) identifying an image corresponding to one or more second keywords, wherein the image/keyword mapping table is indexed based on image IDs;

for each of images identified in the image/keyword mapping table, determining a matching degree between the first keywords and the second keywords, wherein the matching degree is determined based on (i) a first ratio of a number of keywords in the first keywords that match the second keywords to a number of keywords in the first keywords, and (ii) a second ratio of the number of matched keywords to a number of keywords in the second keywords, wherein a matching degree with at least a portion of the first keywords matching the second keywords is higher than a matching degree of which none of the first keywords matches any of the second keywords;

ranking a plurality of images identified in the image/keyword mapping table whose second keywords match at least a portion of the first keywords based on the determined matching degrees; and selecting, from the ranked images, one or more image candidates having a matching degree higher than a predetermined threshold, wherein the selected image candidates are integrated with a list of content items.

10. The non-transitory machine-readable medium of claim 9, wherein the operations further comprise:
performing a search in a content store based on the search query to identifying the list of content items; and
associating at least a portion of the ranked images with at least a portion of the content items based on ranking.

11. The non-transitory machine-readable medium of claim 10, wherein the operations further comprise:

integrating the at least a portion of the ranked images with the at least a portion of the content items to generate a search result; and transmitting the search result to the client device, wherein the ranked images are used as background images for the content items.

12. The non-transitory machine-readable medium of claim 9, wherein determining a matching degree between the first keywords and the second keywords comprises:

determining whether a first entry of the image/keyword mapping table contains third keywords that include all the first keywords of the search query; and assigning a first predetermined score to a first image associated with the first entry, in response to determining that the third keywords exactly match the first keywords.

13. The non-transitory machine-readable medium of claim 9, wherein determining a matching degree between the first keywords and the second keywords comprises:

determining whether a second entry of the image/keyword mapping table contains one or more fourth keywords that include a portion of the first keywords of the search query; and assigning a second predetermined score to a second image associated with the second entry, in response to determining that one or more fourth keywords that match a portion of the first keywords.

14. The non-transitory machine-readable medium of claim 9, wherein determining a matching degree between the first keywords and the second keywords comprises:

determining whether a third entry of the image/keyword mapping table contains one or more fifth keywords that are semantically similar to at least a portion of the first keywords of the search query; and assigning a third predetermined score to a third image associated with the third entry, in response to determining that one or more fifth keywords that are semantically similar to at least a portion of the first keywords, wherein the images are ranked based on corresponding scores of the images.

15. The non-transitory machine-readable medium of claim 9, wherein determining a matching degree between the first keywords and the second keywords comprises:

determining a first number of keywords matched between the first keywords and the second keywords of a first entry in the image/keyword mapping table;

determining a second number of keywords included in the query; and calculating a matching score representing the matching degree based on the first number of keywords and the second number of keywords.

16. The non-transitory machine-readable medium of claim 15, wherein the operations further comprise determining a third number of keywords included in the first entry of the image/keyword mapping table, wherein the matching score is calculated further based on the third number of keywords.

17. A data processing system, comprising:

a processor;

a memory coupled to the processor;

a query analysis module, in response to a search query received from a client device for searching web content, to determine one or more first keywords from the search query;

a matching module to perform a lookup operation in an image-to-keyword (image/keyword) mapping table based on the first keywords, the image/keyword mapping table including a plurality of entries, each entry mapping an image identifier (ID) identifying an image to one or more second keywords, wherein the image/keyword mapping table is indexed based on image IDs; and a ranking module, for each of images identified in the image/keyword mapping table, to determine a matching degree between the first keywords and the second keywords, wherein the matching degree is determined based on (i) a first ratio of a number of keywords in the first keywords that match the second keywords to a number of keywords in the first keywords, and (ii) a second ratio of the number of matched keywords to a number of keywords in the second keywords, wherein a matching degree with at least a portion of the first keywords matching the second keywords is higher than a matching degree of which none of the first keywords matches any of the second keywords, to rank a plurality of images identified in the image/keyword mapping table whose second keywords match at least a portion of the first keywords based on the determined matching degrees, and to select, from the ranked images, one or more image candidates having a matching degree higher than a predetermined threshold, wherein the selected image candidates are integrated with a list of content items.

18. The system of claim 17, wherein a search engine to:
perform a search in a content store based on the search query to identifying the list of content items, and
associate at least a portion of the ranked images with at least a portion of the content items based on ranking.

19. The system of claim 18, wherein the search engine is further to:
integrate the at least a portion of the ranked images with the at least a portion of the content items to generate a search result, and
transmit the search result to the client device, wherein the ranked images are used as background images for the content items.

20. The system of claim 17, wherein determining a matching degree between the first keywords and the second keywords comprises:

determining whether a first entry of the image/keyword mapping table contains third keywords that include all the first keywords of the search query; and assigning a first predetermined score to a first image associated with the first entry, in response to determining that the third keywords exactly match the first keywords.

21. The system of claim 17, wherein determining a matching degree between the first keywords and the second keywords comprises:

determine whether a second entry of the image/keyword mapping table contains one or more fourth keywords that include a portion of the first keywords of the search query, and assign a second predetermined score to a second image associated with the second entry, in response to determining that one or more fourth keywords that match a portion of the first keywords.

22. The system of claim 17, wherein determining a matching degree between the first keywords and the second keywords comprises:

determine whether a third entry of the image/keyword mapping table contains one or more fifth keywords that are semantically similar to at least a portion of the first keywords of the search query, and assign a third predetermined score to a third image associated with the third entry, in response to determining that one or more fifth keywords that are semantically similar to at least a portion of the first keywords, wherein the images are ranked based on corresponding scores of the images.

23. The system of claim 17, wherein determining a matching degree between the first keywords and the second keywords comprises:
   determining a first number of keywords matched between the first keywords and the second keywords of a first entry in the image/keyword mapping table;
   determining a second number of keywords included in the query; and
   calculating a matching score representing the matching degree based on the first number of keywords and the second number of keywords.

24. The system of claim 23, wherein the wherein the ranking module is further to determine a third number of keywords included in the first entry of the image/keyword mapping table, wherein the matching score is calculated further based on the third number of keywords.

\* \* \* \* \*